July 14, 1936.  J. A. SERRELL  2,047,803
HEATING SYSTEM
Filed April 20, 1929   10 Sheets-Sheet 2
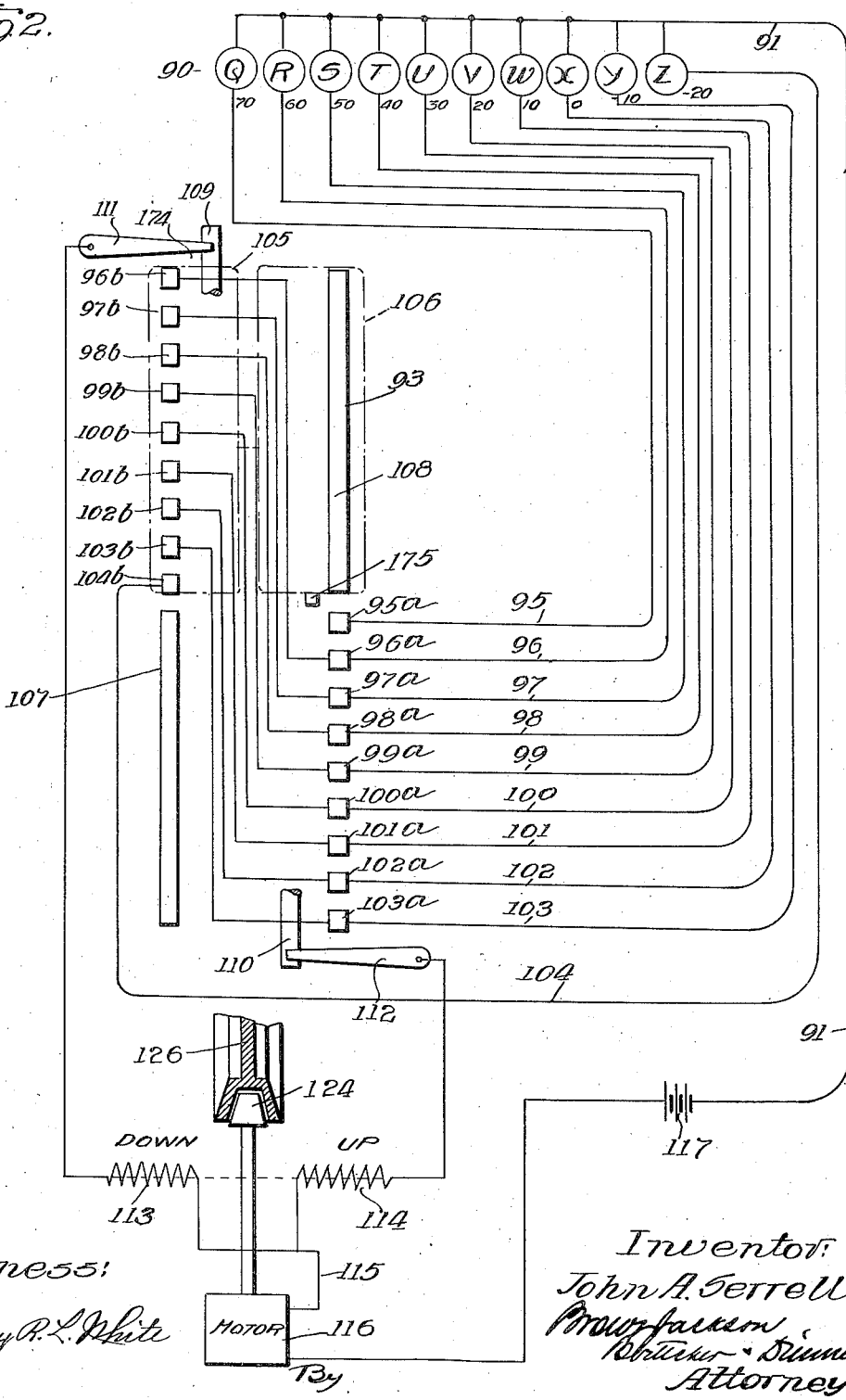

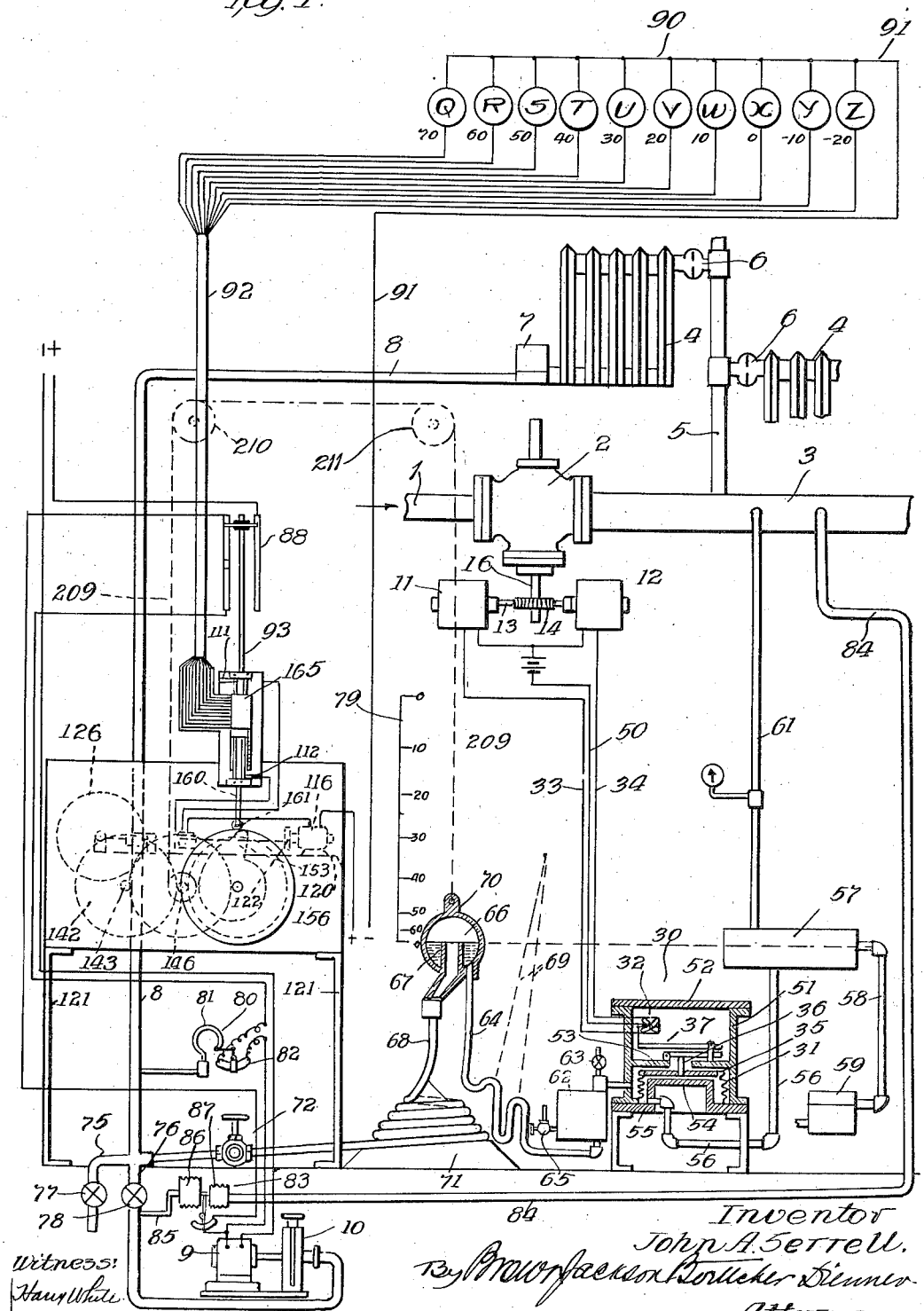

July 14, 1936.  J. A. SERRELL  2,047,803
HEATING SYSTEM
Filed April 20, 1929   10 Sheets-Sheet 3
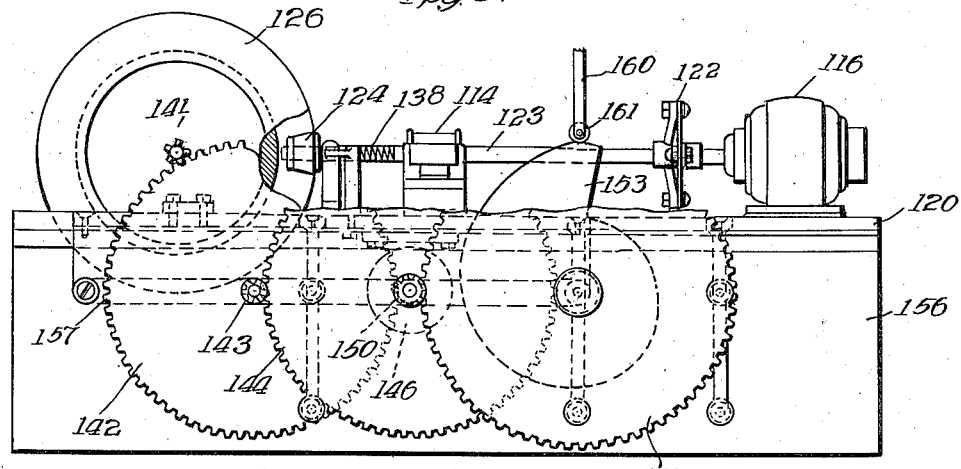
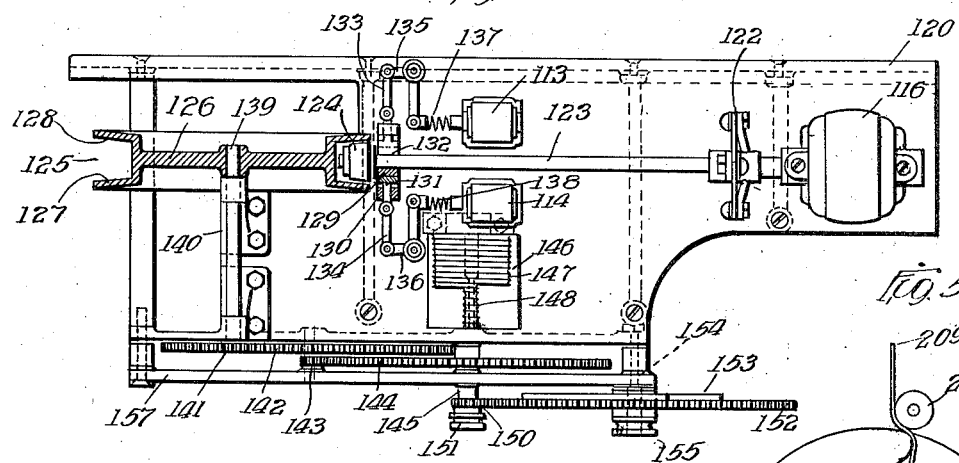
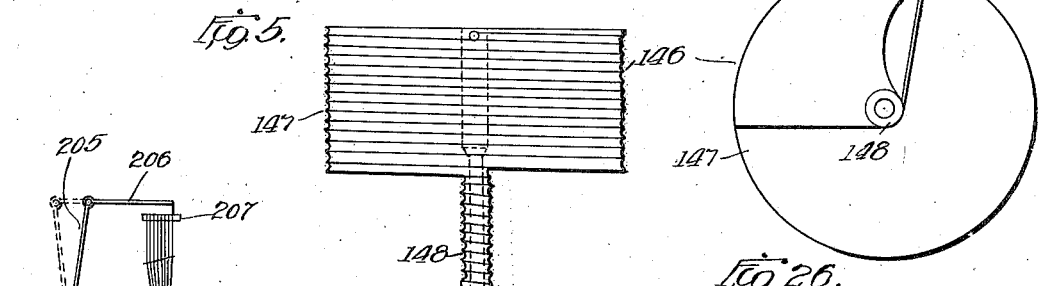
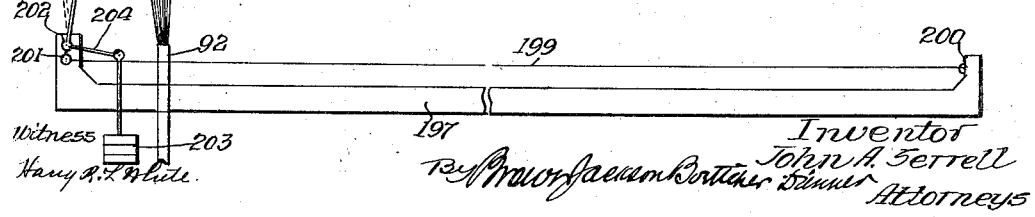

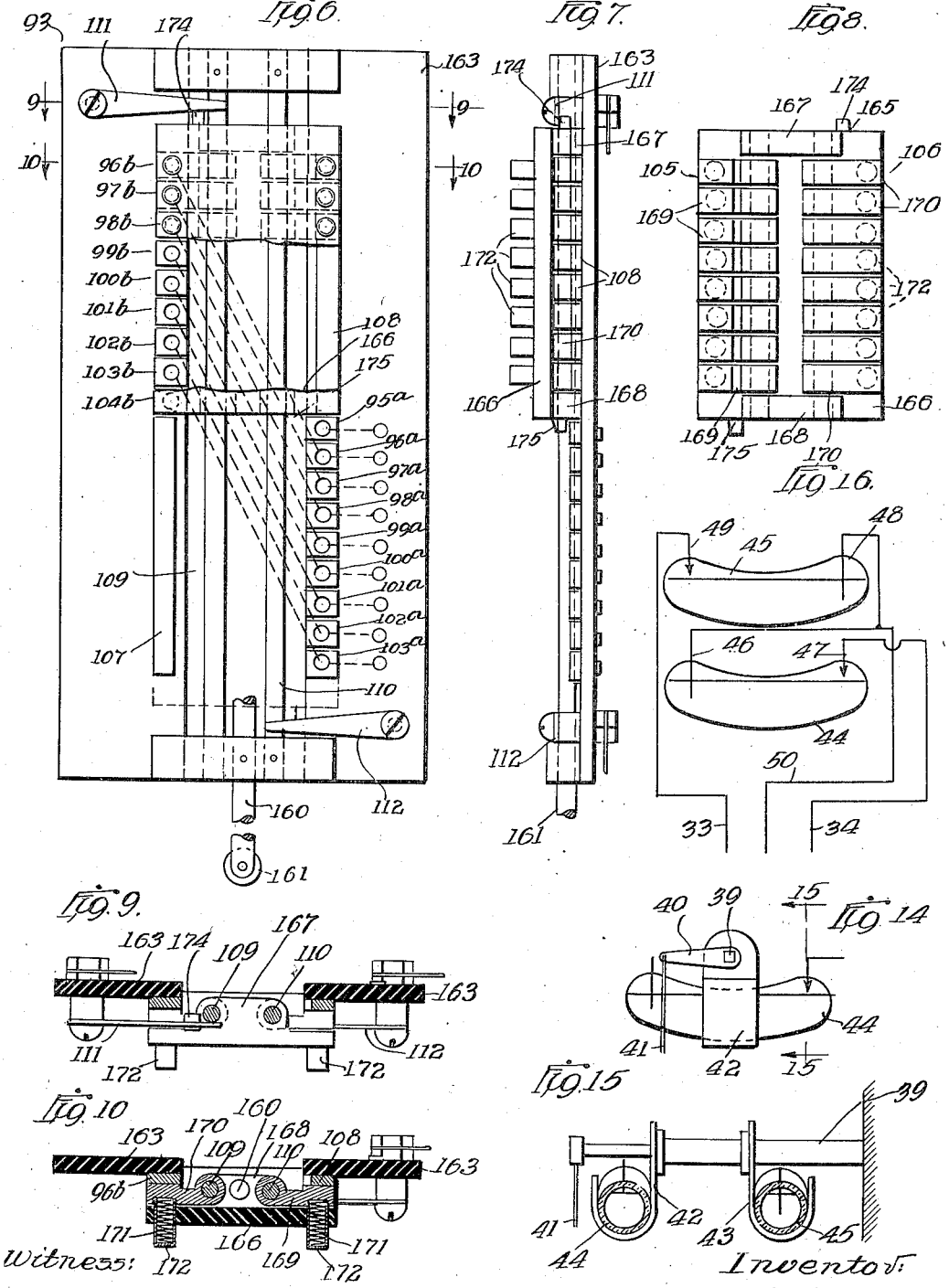

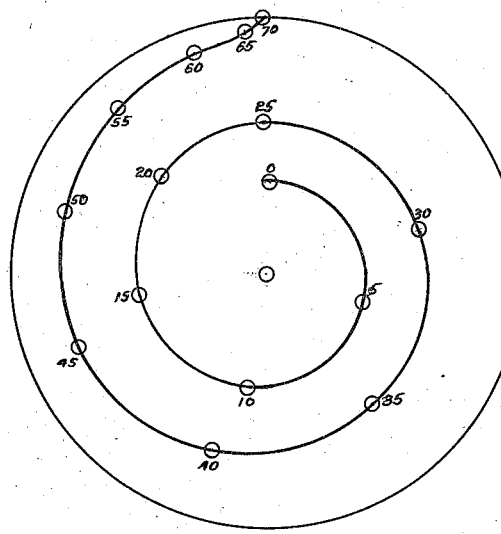
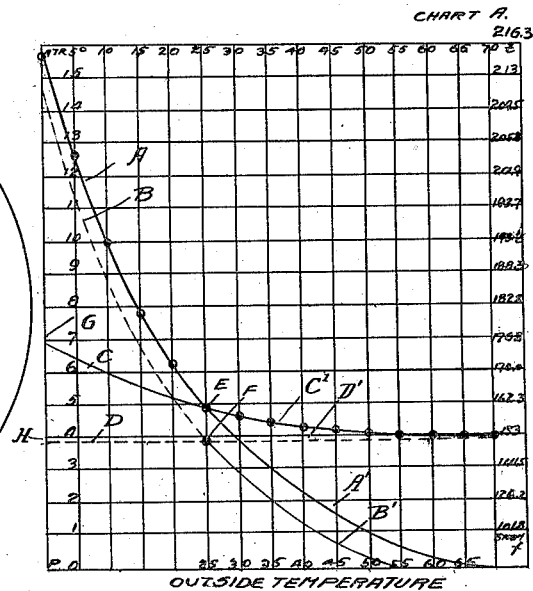
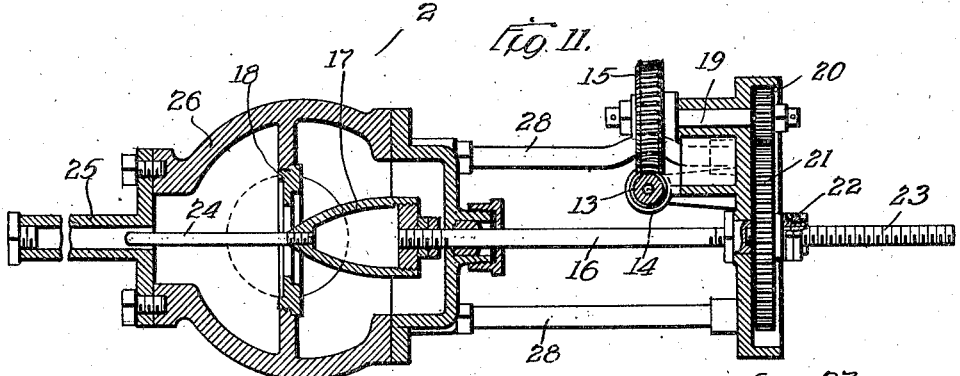
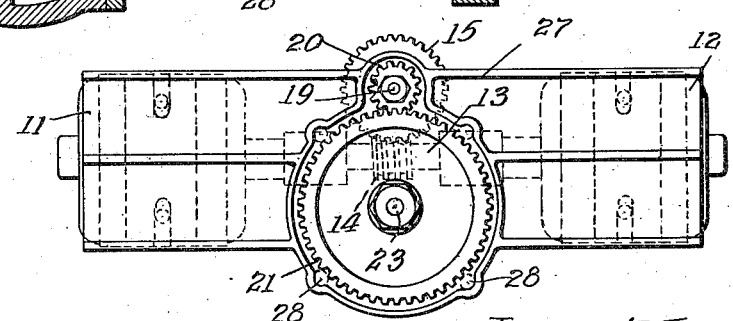

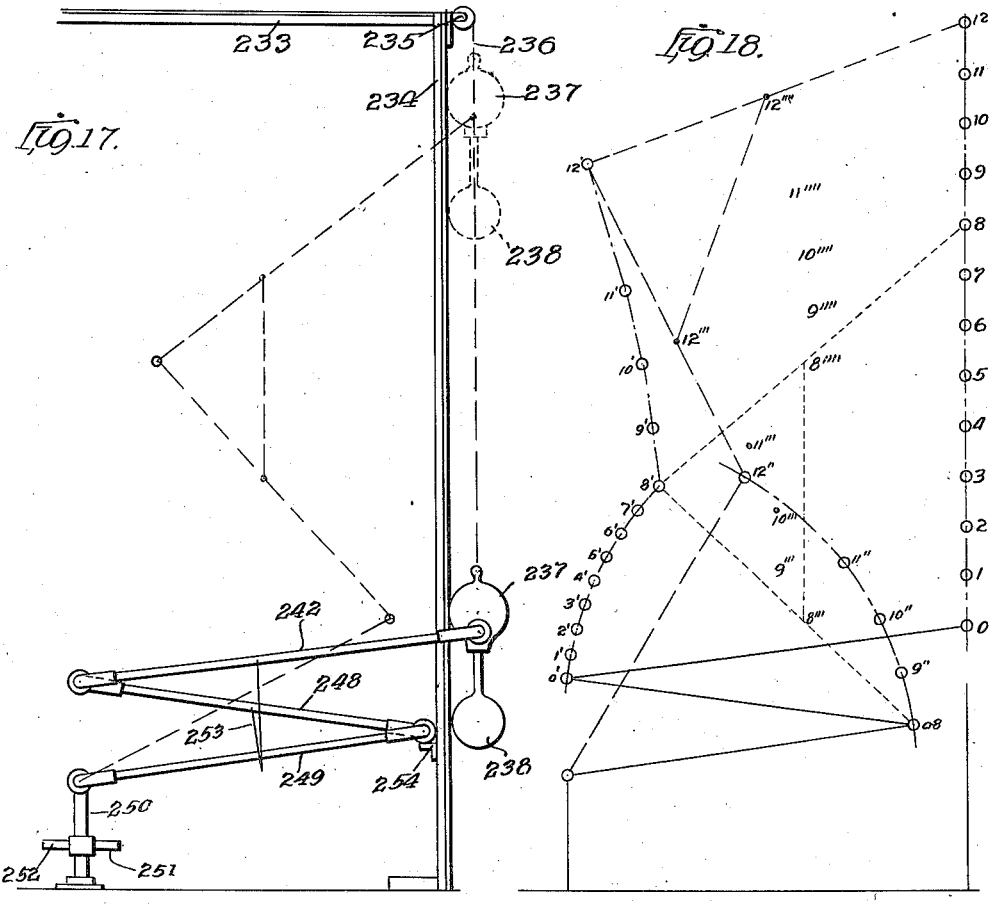
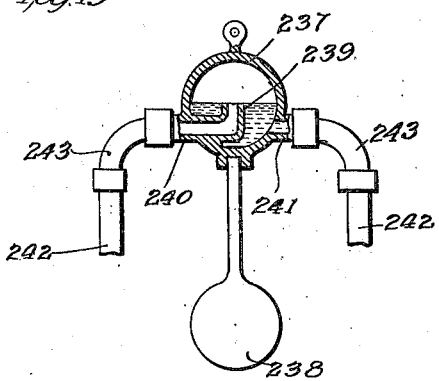
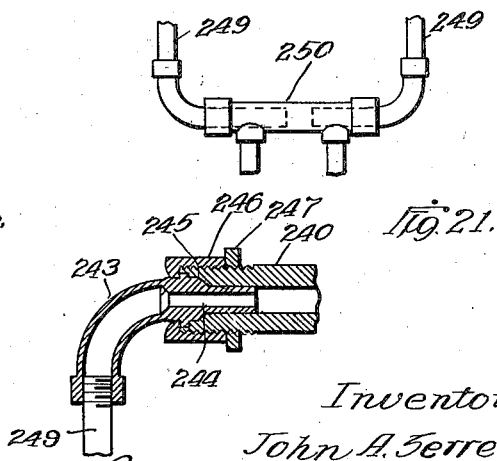

July 14, 1936.　　　J. A. SERRELL　　　2,047,803
HEATING SYSTEM
Filed April 20, 1929　　　10 Sheets-Sheet 7
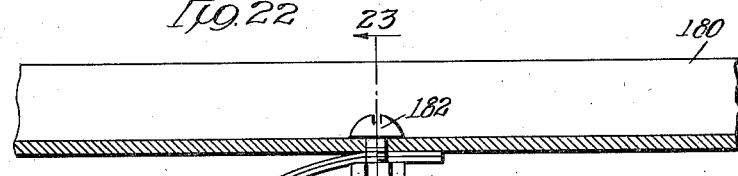
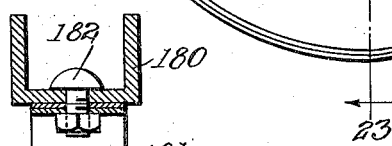
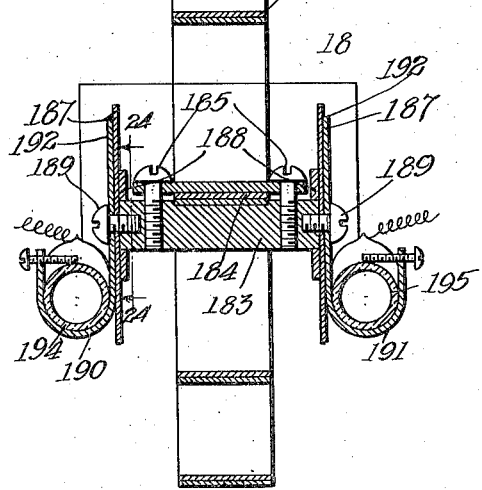
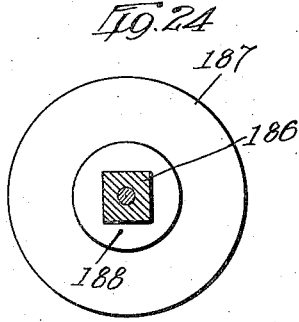
Inventor
John A. Serrell
Attorneys

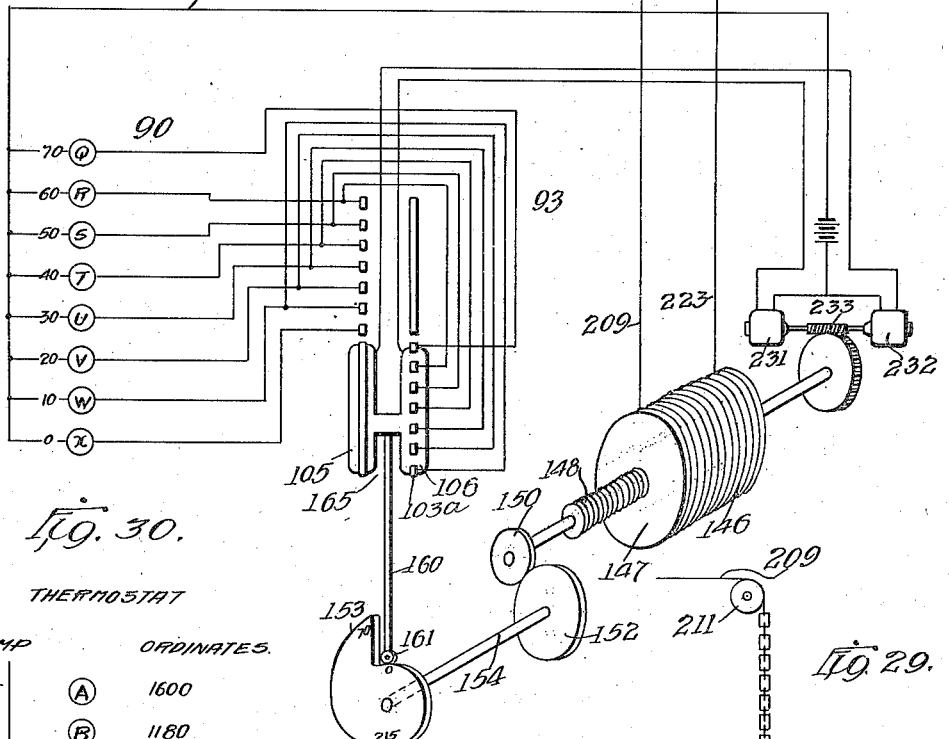

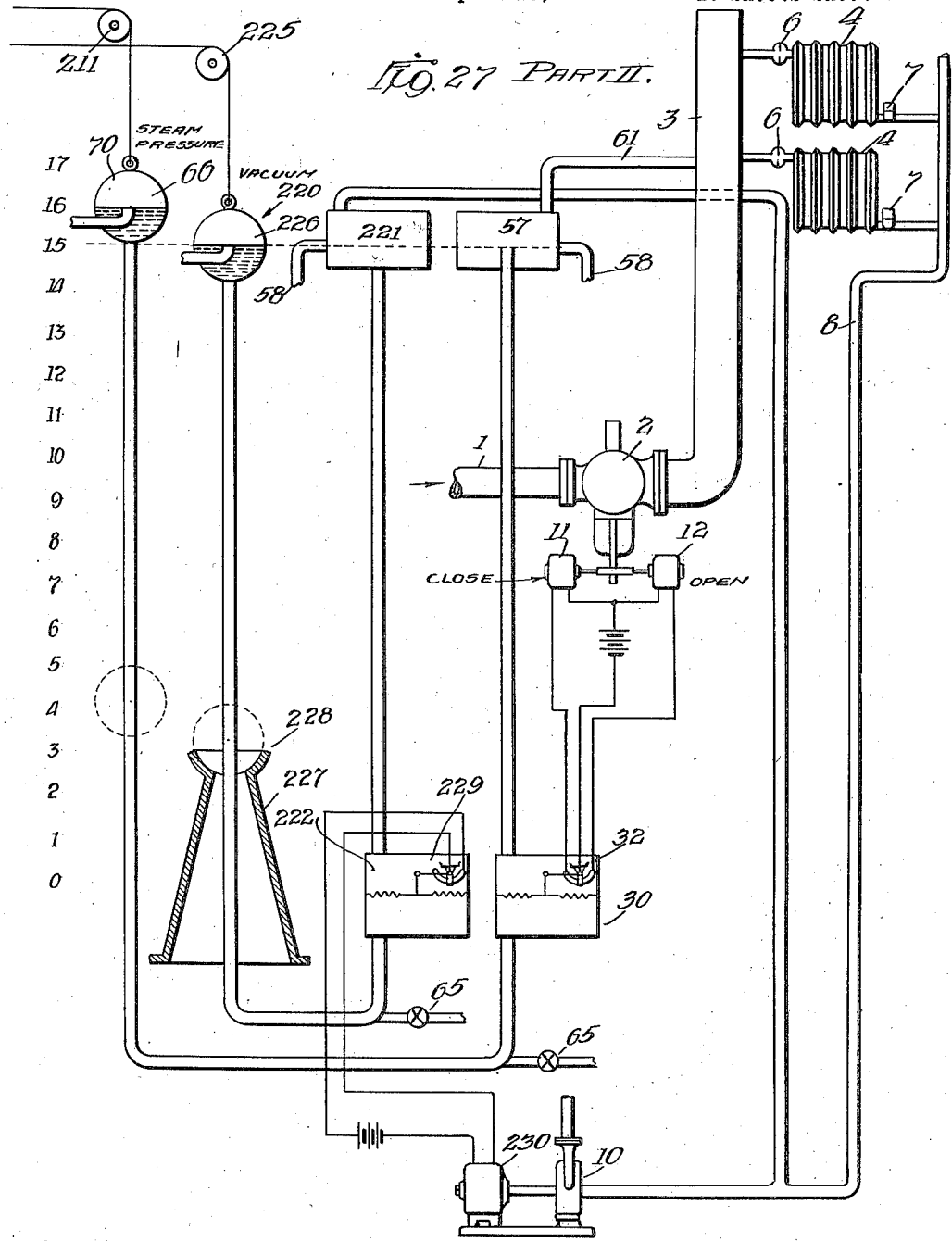

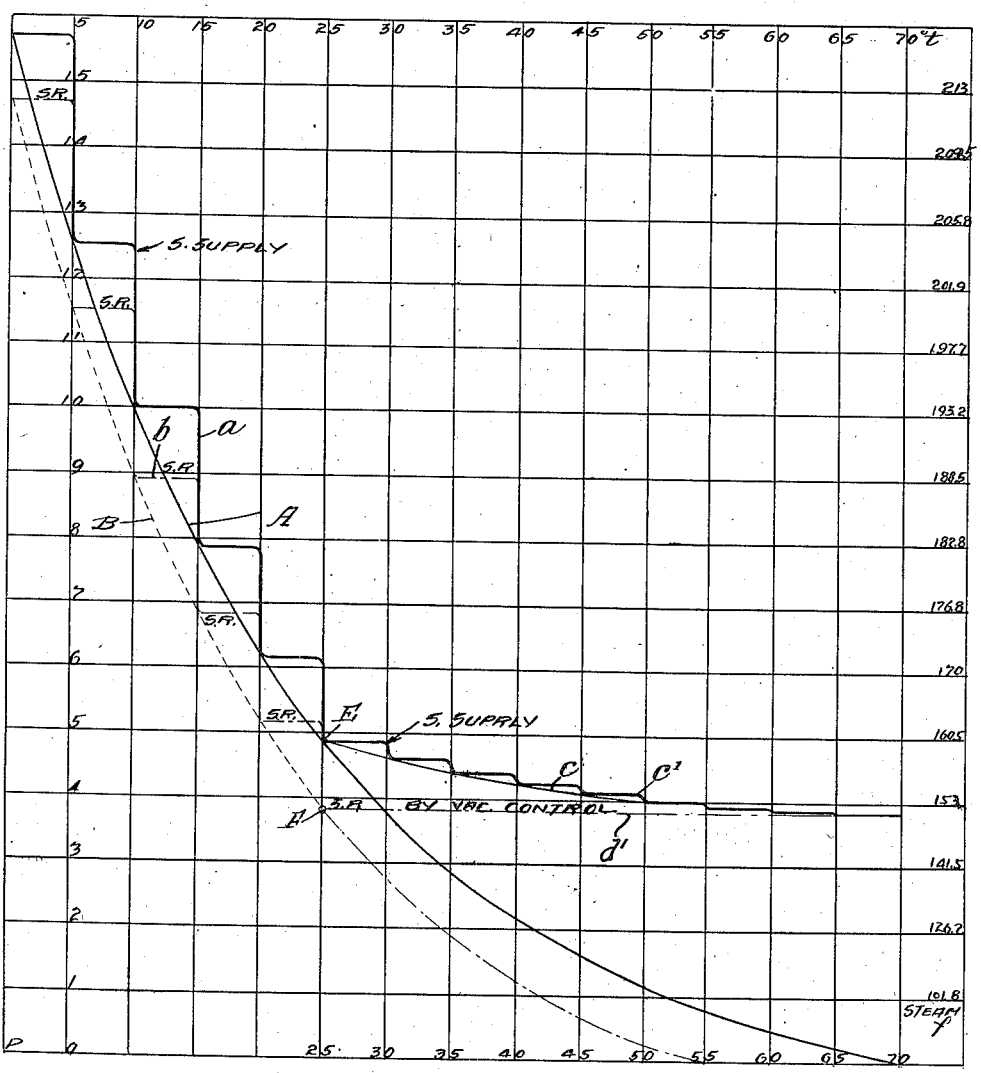

Patented July 14, 1936

2,047,803

UNITED STATES PATENT OFFICE 2,047,803

HEATING SYSTEM

John A. Serrell, Pass-A-Grille, Fla., assignor to Warren Webster & Company, Camden, N. J., a corporation of New Jersey Application April 20, 1929, Serial No. 356,650

38 Claims. (Cl. 237—9)

My invention relates to steam heating systems and the like.

The general object in a heating system of the character to which my invention relates is to maintain a desired temperature condition in the building to which it is applied.

In the preferred form of the present invention the heating fluid, which is preferably but not necessarily steam, is applied to the radiators or other heat emitting or freeing devices in such quantities as will, by relation to the outside temperature, maintain the temperature within the building at a predetermined temperature or such a schedule of temperatures as may be predetermined.

Any heating system which is properly designed has the radiators properly proportioned both with respect to the space to be heated and the maximum temperature difference between the predetermined inside temperature and the outside variable temperature, taking into account the heating medium which is to be employed and the range of variation of a particular variable characteristic of the medium which is to be governed.

Now, the quantity of heat to be given off from the radiator, assuming that room temperature is kept substantially constant, may be controlled in two general ways, namely, first, by controlling the amount or per cent of the total amount of surface of the radiator which is heated, that is by variable filling of the radiators with the heating medium or variation of rate of flow of the heating medium delivered to the radiators, and second, by varying the temperature of the heating medium within the radiator. Both schemes of varying the heat emission of the radiator may be employed in the same system, and in the preferred form of the present invention both such methods are employed in combination.

According to the preferred form of the present invention, I arbitrarily divide the working range of temperatures, which is assumed in the present case to be of from negative 10° F. (—10° F.) to 70° F. into predetermined steps or ranges. As will more fully appear, these steps may be made as minute as desired, or in fact may, within the broad method of my invention, be considered as a continuous progression.

Any particular installation will be designed for a given working range of outside temperature, as, for example, from 10° below zero F. to 70° F. Heating fluid which may be suitably controlled is provided to meet the conditions of varying heat requirements. The heating fluid may be steam from high or low pressure boilers or exhaust from engines or turbines of power generating systems, or hot water under varying pressure difference or degrees of temperature. Assuming, for example, that saturated steam at 2 pounds gauge pressure is available, this will provide a suitable heating medium for the operation of my invention.

Now in considering the amount of heat required to maintain a given building or room therein at a predetermined temperature of say 70° F. for various outside temperatures lower than 70° F., it may be considered as accepted that in general the quantity of heat required to maintain such constant inside temperature is directly proportional to the temperature difference between inside and outside. This disregards varying winds and radiant heat from the sun which, however, do not change the truth of the fundamental statement. This means that the heat required is a linear function of the outside temperature variation. It would appear, therefore, to be simple to provide a direct thermostatic control between outside temperature changes and heat supplied. But there is no simple and direct way to measure or control heat in a heating medium such as steam.

Systems are known in which steam is metered by volume through metering orifices by the expedient of varying the head of steam impressed upon the orifices, meanwhile keeping the return line at a predetermined pressure, such as atmospheric or any selected pressure preferably below atmosphere. This method amounts to partial filling of the radiators with steam at a certain temperature in accordance with the per cent of maximum heat requirement. Such part of the radiator as is not filled with steam is filled with air or other non-condensible gases, which may move into or out of the radiator through the open connection with the return main. A practical difficulty is the coordination of volume with controlling temperature difference, because flow of steam through an orifice is not a linear function of pressure difference on the orifice. This can be overcome by mechanical or electrical or other ratio changing mechanisms. Where atmospheric return is employed another difficulty resides in distributing the steam properly upon small flow rates as is required in mild weather, that is, as the outside temperature approaches 70° F. Another difficulty resides in the requirement to have relatively large capacity radiators in order to insure that adequate heating will be accomplished at maximum temperature differences between inside and outside.

Systems are also known where the radiator is filled with steam at varying temperatures and the heat emission thereby varied. There are several objections to this system, first, is the fact that the only practicable way of varying steam temperature is by varying pressure. The relation between steam pressure or temperature and heat emission is not a direct linear relation and this introduces a complication.

Next, with a filled radiator control of heat emission from the radiator is lost. For example, the radiator will waste heat through an open window. A filled radiator will throw off as much heat as its surrounding medium will absorb. A further difficulty of this form of system as heretofore practiced is the difficulty of maintaining the high ranges of vacuum, or suction, which systems of this character require to gain the lower steam temperatures desired for mild weather.

Now in accordance with the present invention, I aim to employ the advantages of metering by volume and the consequent advantages of partially filled radiators particularly for milder weather, together with the advantage of varying the steam temperature within the radiator by pressure control. I may do this by maintaining a substantially constant differential of pressure between the supply line pressure and return line pressure throughout a part of the range and a varying differential throughout another part of the range, or both variations but in different degree in different parts of the working range of temperatures.

In the preferred form of the invention, I vary the heat emission of the radiator through control of the steam temperature by varying the steam pressure in the radiator in one part of the range. In another part of the range I vary the pressure difference between the steam supply line and the return line, to produce a controlled rate of flow which will fill the radiator to a variable degree with steam at return line pressure, the remainder of the radiator being in such case filled with air or other non-condensible gases.

In the preferred embodiment I provide a cam or control element which mechanically embodies the relation between linear temperature variations and non-linear fluid supply or fluid temperature variations, or the like, to give linear variation of heat emitted at the radiator in proportion to the controlling temperature variation. That is to say, I mechanically compensate for the non-linear variation of the practical means governing heat delivery so that the resultant heat delivery is actually a linear function of controlling temperature variation. This relation may be embodied in a wide variety of mechanical devices other than a cam which are the equivalent of a cam in my combination for embodying the non-linear relation. While I speak of mechanical compensation, I intend to include electrical, hydraulic, or similar action.

While in the preferred embodiment I show electrical control means for relating the increments or decrements of temperature to the increments or decrements of motion of the cam or like mechanical device, and show hydraulic means for relating the control exercised by the cam, or the motion of the cam to the pressure or flow regulating valve, I do not intend to be limited to the specific form of the elements but intend that all equivalents are to be considered as included in the claims hereinafter set forth.

Also, while I have shown in the preferred embodiment the cam as governed by relatively coarse increments or decrements of outside temperature, this is not to be considered as limiting as the motion of the cam may be coordinated to as small increments or decrements of temperature as may be desired.

In the preferred embodiment, I employ a rotary cam the angular motion of which is proportional to a curve, such as a square root curve or any non-linear equation, and a cylindrical winding drum for varying a pressure controlling device in equal increments of pressure for equal increment of angular motion of the drum. I may use a simple spiral cam providing uniform motion and a variable radius drum providing non-uniform motion, which drum embodies the non-linear equation. Also, as I shall hereinafter show more in detail, I may provide a temperature controlled device which acts in steps or increments which are proportional to the square root curve or like non-linear equation. For example, instead of having circuits closed or open upon equal increments or decrements of temperature, the circuits may be opened or closed upon increments or decrements of temperature which are proportional to the square roots of temperature.

Likewise, the variable or non-linear relation may be embodied in the contact bank or in any other link in the chain of elements, if desired, instead of in the thermostat or cam or drum.

Now, in order to acquaint those skilled in the art with the manner of constructing and operating a device embodying my invention, I shall describe in connection with the accompanying drawings a specific embodiment of the same.

In the drawings:

Fig. 1 is a diagram more or less conventional of a system embodying my invention and having different capabilities of operation, as will be explained later;

Figure 2 is a circuit diagram explaining the electrical connections and the operation of the positional responsive mechanism controlled by the thermostat;

Figure 3 is a side view with parts broken away of the cam and drum operating mechanism;

Figure 4 is a plan view of the same;

Figure 5 is a plan view on an enlarged scale of the winding drum;

Fig. 5A is an end view of the drum and guide pulley;

Figure 6 is a front elevational view of the selector with its contacts and wipers with parts broken away;

Figure 7 is a side elevational view of the contact mechanism for registering the position of the cam with the thermostat which is active at a particular temperature;

Figure 8 is a plan view of the movable contact mechanism;

Figure 9 is a section taken on the line 9—9 of Figure 6;

Figure 10 is a section taken on the line 10—10 of Figure 6;

Figure 11 is a transverse section through the steam control valve;

Figure 12 is a side view of the same taken from the right of Figure 11;

Figure 13 is a layout of a cam;

Figure 14 is a side view of the pressure control switch contact mechanism;

Figure 15 is a cross-sectional view of the same on the line 15—15 of Figure 14;

Figure 16 is a diagram of connections of the switch shown in Figures 14 and 15;

Figure 17 is a side elevational view of a modified form of variable hydrostatic column mechanism;

Figure 18 is a diagram of the motion of the same;

Figure 19 is a section through the chamber at the top of the column;

Figure 20 is an end view of the lower pivotal joint of the pipes connected to the chamber;

Figure 21 is a detail of the rotatable joint between a swinging pipe and its stationary connection;

Figure 22 is a side view of one of the thermostats such as may be employed in accordance with my invention;

Figure 23 is a vertical section through the same taken on the line 23—23 on Figure 22;

Figure 24 is a section taken on the line 24—24 of Figure 23;

Figure 25 is a chart illustrating two modes of varying heat delivery and capable of joint use in my invention;

Figure 26 is a side view of a modified form of thermostatic control element;

Figure 27, which is placed on two sheets and comprising two parts, is a diagram of the preferred form of my invention;

Figure 28 is a chart showing the successive steps of supply and return pressure throughout the range of the system;

Figure 29 is a sectional view of a modified form of pressure control device; and Figure 30 is a table explaining the magnitude of the ordinates shown in Figure 28.

Referring, first, to Figure 25, the chart therein shown has abscissae graduated in temperature Fahrenheit. The ordinates are graduated in terms of absolute pressure. This chart is not intended to be absolutely accurate but is explanatory only. The ordinates at the right margin of the chart are degrees of Fahrenheit temperature of steam corresponding to the absolute pressure at the left. This chart indicates two separate theories of steam heating. Curves A and B represent, respectively, supply line pressure and return line pressure in a steam heating system where the variations in heat emission are to be controlled by varying the temperature of steam within the radiator. That is to say, assume for an outside temperature of zero, steam is supplied at a pressure slightly above atmospheric, that is of the order of 15.7 pounds per square inch at a temperature around 215° and the return line pressure is kept, as by a differential control mechanism, at a pressure always below the steam supply pressure by a predetermined amount of the order of 1 pound per square inch. Then as the outside temperature rises, by suitable control mechanism the pressure at which steam is supplied to the radiator is reduced successively as indicated by the curve A and the return line pressure is maintained a fixed differential below the supply line pressure, as indicated by the curve B.

Now, it will be seen that as the absolute pressure is required to be dropped by the curve A the pump which exhausts the return line and causes the reduced pressure in the supply line is compelled to do a relatively great amount of work particularly if any leak should occur in the system. The volumes which correspond to the reduced pressure, that is the volume of an expansible fluid such as steam or air which must be handled at the lower pressures is relatively great and at the high vacuum represented by the lower part of the curves A and B the leakage of even a small amount of air into the system is highly detrimental.

A system operating on the fixed differential principle employs the radiators full of steam and varies the temperature of the steam by varying the pressure. Such a system as heretofore known and employing steam traps to retain the steam in the radiators has one fundamental defect which for the lower ranges of outside temperature difference is highly undesirable, namely, that the emission of heat from the radiators is not under the control of the regulating mechanism but under the control of the surrounding medium, that is, the medium surrounding the radiator. That is to say, if the occupant of a particular room which is to be kept at a predetermined temperature opens the window of the room, or other opening to the outside, the cold air which is thereby admitted to the radiator is able to abstract heat readily and a very large amount of heat may be thrown off from the radiator which is normally intended to throw off a relatively small amount.

By such window opening heat may be wasted as the only thing which controls the emission of heat from the radiator is the temperature difference between the inside of the radiator and the outside, other things remaining the same.

Unless the regulation is held very close to that desired by the occupant of the room, he will open the window to admit fresh air and the radiator tries to heat all outdoors.

Now, referring to curves C and D, the curve D represents a constant pressure which may be any desired pressure. It may be atmosphere, if an open atmospheric return is employed, or it may be a pressure below atmosphere or it might even be a pressure above atmosphere. As shown, curve D is a constant pressure which is maintained in the return line and in this case it is slightly below 4 pounds absolute pressure. Curve C represents the pressure in the supply main where partial filling of the radiators is employed. Assume that the radiators are of a size that when filled with steam at the maximum pressure and hence temperature for the coldest outside temperatures for which the system is designed they will keep the inside of the building at a suitable temperature such as 70° F. Between the supply main and the interior of the radiator a metering orifice is employed and this metering orifice restricts the flow of steam, but under variations of pressure delivers variable flow in accordance with known laws of flow through an orifice. Such variable rate of flow will keep the radiator fractionally filled with a correspondingly variable volume of steam, the remaining volume of the radiator which is not filled with steam being filled with non-condensible gases which are free to flow into or out of the radiator through the open connection between the radiator and the return main.

Assuming that at zero temperature, for which chart Figure 25 has been drawn as the maximum temperature difference between inside and outside, the radiator is filled completely, then for each successive outside temperature represented by the chart the radiator will be partially filled with steam, the percentage of filling with steam corresponding to the percentage of maximum temperature difference represented by the particular prevailing outside temperature. In each case the part of the radiator not filled with steam contains air or other gases. Thus, for example, at zero the maximum difference between inside temperature and outside prevailing temperature exists. The radiator is, therefore, 100% full of steam. At the other end of the curve when the outside temperature is 70°, and assume that the inside predetermined temperature is 70°, no temperature difference exists, that is, the difference is zero, and hence zero percentage of the radiator is to be filled with steam, or in other words the entire space within the radiator is occupied by air or other gases.

Now, the temperature of the steam in the radiator is substantially uniform as represented by the line or curve D, since that is the pressure prevailing in the return line and in the radiator, the radiator outlet being open to the return line.

With the scheme of heating represented by the curve A—B as heretofore known filled radiators throughout are essential and a thermostatically or other suitably controlled steam trap to prevent the escape of steam out of the radiator into the return line is essential.

In the partial filling scheme represented by the curve C—D the radiator is never filled except at maximum load and steam traps are not required although as a practical convenience they may be and are sometimes employed.

Now I wish to point to the fact that the system shown in Figure 1 is capable of operating a steam heating system on either one of the aforesaid theories. That is to say, with the mechanism of the diagram shown in Figure 1 I may operate on the constant differential principle represented by curves A and B, or I may operate on the partial filling theory of curves C and D and automatically, in accordance with outside temperatures, maintain the temperature within the building, or structure to be heated, at the predetermined value. That is to say, Figure 1 shows a system of automatic regulation which is operable either in accordance with the constant differential, constantly filled radiator theory or in accordance with the variable differential partially filled radiator theory.

Next, I wish to point out that neither system of heating as above described is completely free of defect and that in accordance with one phase of my present invention I may combine the two theories to secure a highly advantageous result.

That is, according to one form of my invention, I propose to employ partial filling of the radiator with steam during the time that there is small heat requirement, that is in the part of the range of operation in which the difference between the outside prevailing temperature and the predetermined inside temperature is relatively small and the requirement for heat emission by the radiator is, likewise, small, and to employ in the ranges of temperature where the difference between the outside prevailing temperature and the inside predetermined temperature is relatively high to use the filled radiator and to vary the heat emitting qualities of the radiator by variation of the temperature of the steam therewithin. Assume, for example, that an average condition of 25° F. or more prevails during the greater part of the season that the heating system is employed. Assume that at that outside temperature, namely 25° F., the radiator is filled with steam and as the outside temperature drops lower the temperature of the steam within the radiator is increased so as to increase the heat emission of the same according to the part of the curves A and B lying to the left of the points E and F in Figure 25, and assume that for temperatures higher than 25° F. partial filling of the radiator is employed with the steam in the radiator at a fixed or substantially fixed temperature, the system would then operate according to that part of the curves C and D lying to the right of points E and F.

It is to be observed that the difficulty of a constant differential system as represented by the curves A and B resides in, first, the difficulty of maintaining the high vacua for low heating rate and, next, the possibility of heat wastage as by open windows and the like.

If the system were operated according to the curves C and D, it will be seen at once that a radiator of larger volume would be required to provide the fractional relation below the maximum represented by the rate of flow due to the pressure difference represented by the length of the line between the points G and H on Figure 25.

By employing a radiator of a capacity no larger than the rate of flow due to the pressure difference that is represented by the length of the line between the points E and F all the advantage of the lower temperature difference range lying to the right of the points E—F may be secured and all the advantage of the constant differential filled radiator system lying to the left of the points E—F on lines A and B may be employed. That is to say, according to this mode of operation of my invention a smaller radiator may be employed to provide the necessary heat emission, this radiator being fractionally filled, i. e., partly filled with steam and partly filled with air in the desired proportions, throughout the range above 25° F. to 70° F. and being completely filled with steam for all outside temperatures below 25° F. but having the steam temperature therein varied in order to control the rate of heat emission to the space to be heated.

While I show, according to Figure 25, the system as operated mainly below atmospheric pressure, it is to be understood that the absolute pressure of the line D which is the base line of the vacuum return system may be any desired value without departing from my invention. It is, however, desirable to operate at a pressure less than atmospheric in order to have steam temperatures which are relatively low and, therefore, suitable for the low rates of heat emission represented by relatively high outside temperatures.

Now referring to Figure 1, I show a steam supply main 1 connected through a control valve 2 to a distributing main 3 which in reality is the supply main for the radiators 4, 4. While only two radiators are shown as connected to the branch pipe 5 from the supply main 3, it is to be understood that any number of branches and any number of radiators within the capacity of the system is contemplated. The radiators 4, 4 and the like have control orifices 6 interposed between the branch pipe which supplies steam to the radiators and the inside of such radiators. These orifice plates 6, 6 may be inserted in any suitable manner and may be changeable in order to modulate the rate of delivery, but upon being adjusted, are functionally fixed.

The radiators, such as 4, 4, are provided with steam traps 7 which may be of the well known thermostatic type operating to close the outlet from the radiators to the return main 8 when steam impinges upon them and tends to pass through outlet opening of the radiator to the return line 8. The construction of such thermostatic traps is well known.

The return line 8 leads back to a suitable suction pump 10 which may be driven as by a motor 9 under the control of a suitable regulator for governing the pressure in the return line 8.

The control of steam flowing from the high pressure main 1 to the distributing or supply main 3 is under the control of the valve 2 which is remote controlled, that is it is motor operated as, for example, by a pair of motors such as 11 and 12 operating on a common shaft 13 having a worm 14 connected to a worm gear 15 for driving a threaded nut upon a stem 16 for moving a valve plug or controlling member 17 (see Figure 11) towards or away from a seat, such as 18.

The detailed construction of the valve 2 is shown in Figures 11 and 12. The motors 11 and 12 are connected to a common worm shaft 13 having the worm 14 cooperating with a worm wheel 15 which drives the pinion shaft 19.

The pinion shaft 19 has a pinion 20 meshing with the gear 21 and the gear 21 has a threaded hub 22 forming a nut for operating upon the threads of the valve stem 16. Thus by rotation of the motor shaft in one direction the stem 16 will be moved endwise in a corresponding direction and when the motor shaft is reversed, the stem 16 will travel in the reverse direction. The valve plug member 17 is given a suitable shape which will, for equal increments of axial motion of the stem 16, provide equal increment of flow. A guiding stem 24 is guided in a tubular extension 25 forming a part of the valve housing 26. The motors and gears are preferably mounted upon a frame 27 which is connected to the valve body through supporting posts or pillars 28, 28.

Any suitable form of motor controlled valve may be employed, the above being an example of a suitable form. It will be seen that the valve 2 is in effect an adjustable flow restriction to the steam from the high pressure main 1 to the supply main 3.

The control of the motors 11 and 12 is exercised by a suitable pressure difference measuring instrument 30 which I term a pressurestat. The pressurestat 30 is a zero method pressure difference control device, that is to say, pressures upon opposite sides of the flexible diaphragm 31 are normally balanced and the circuit through the circuit controller 32 is normally open. When the flexible member 31 moves in one direction from zero because of the difference in pressure upon opposite sides, one of the circuit wires 33, 34 will be closed to actuate one of the motors 11, 12 for moving the valve plug 17.

The pressurestat comprises the flexible metallic bellows member 31 of inverted cup shape having a bottom or plate member 35 connected through a suitable stem 36 to a system of levers 37 which multiply the motion of said plate 35 and transmit the same to the circuit controller 32. The circuit controller 32 is shown more in detail in Figures 14 to 16, inclusive. It comprises a rocking shaft 39 having an operating arm 40 and a link 41 which link 41 is connected to the lever system 37 so that motion of the levers of the system 37 will tend to rock the shaft 39 in one direction or the other. The shaft 39 has mounted thereupon the spring clips 42 and 43 and these spring clips support mercury bulb switch members 44 and 45. The mercury bulb 44 has a body of mercury therein into which the terminal 46 dips at all times, and when the shaft 39 is in neutral position, the cooperating contact member 47 lies just out of contact with the body of mercury in the bulb 44. The bulb 45 likewise contains a body of mercury and a contact 48 which dips into the mercury and a contact 49 at the opposite end which lies just above the level of the mercury. The contacts 46 and 48 of the two bulbs are connected to the common wire 50 and the contacts 47 and 49 are connected to the wires 34 and 33, respectively, and these wires when the shaft 39 is in neutral position are both open.

Now it can be seen that if the shaft 39 is rocked in either direction, circuit through one of the wires 33, 34 will be closed to a corresponding motor of the pair 11, 12 so as to operate the valve plug 17 in the desired direction. Opening or closing of the valve plug alters the pressure prevailing in the supply pipe 3 to the radiators 4, 4 with the result that a tendency is set into operation which will restore the pressure balance in the pressurestat 30. The diaphragm member 31 is contained in a housing 51 having a removable cover 52 to permit access to the control switch 32, if need for the same should arise. The diaphragm plate 35 is restrained between two limiting plates 53 and 54 forming part of the pressure chambers on opposite sides of the diaphragm member 31. The chamber below the diphragm member 31 is defined by chamber member 55 which has flanges cooperating with the flanges of the main chamber member 51 and adapted to secure the margins of the corrugated diaphragm 31 between the flanges so as to make a tight joint. A pipe 56 communicates with the bottom chamber, that is below the flexible diaphragm 31, this pipe 56 leading to a constant level chamber 57. This constant level chamber is termed a fixed accumulator and it contains a body of condensate, that is water condensed from the steam supplied by the supply pipe 3, and the level in said chamber 57 is maintained by an overflow connection 58 which leads through the water draining trap 59 to the return system or to the sewer in such a manner as to maintain a seal upon the pipe 58 at all times while permitting the draining of excess water.

The fixed accumulator 57 has a relatively large ratio of free area as compared to the area of the flexible diaphragm 31 so that a change in position of said flexible diaphragm will have very little effect upon the level in the fixed accumulator 57. The top of the fixed accumulator communicates by way of pipe 61 with the supply pipe 3 so that the pressure prevailing in the supply pipe 3 is always imposed upon the surface of liquid in the fixed accumulator 57.

The upper side of the diaphragm 31 is housed in the housing 51 to form a pressure chamber which is normally filled with an insulating oil so as to preserve the insulation of the electrical controller 32 which controller is contained in the housing 51. An oil reservoir 62 is provided for maintaining said upper chamber in the housing 51 full of insulating oil and a drain valve 63 is provided for draining the oil out of said chamber in the housing 51 when it is desired to open the housing to inspect or repair the controller 32. The bottom of the oil reservoir 62 is connected to a flexible pipe 64 and also has an inlet control valve 65 for the constant inflow of a small amount of liquid, such as water, to maintain the flexible pipe 64 full of liquid and to maintain the level of liquid in the chamber 66 even with the top of the overflow connection 67. The chamber 66 with its connections I term the variable accumulator 70. The overflow connection 67 of the variable accumulator 70 comprises a flexible pipe which is adapted to be coiled upon a suitable support 71.

The support 71 may be a conical member upon which the flexible pipe 68 is adapted to coil itself in a predetermined form, preferably so as to maintain a constant drainage through said flexible pipe, either to atmosphere or to the return main 8, as the case may be, a suitable two-way valve 72 being provided for connecting said pipe 68 to either the return main 8 or to atmosphere.

Now considering so much of the system as has been described and assuming that the level of liquid in the chamber 66 is the same level as the level of the surface of the liquid in fixed accumulator 57, and assuming that valve 72 is open to the atmosphere, under these conditions the pressurestat 30 is in neutral position and if the pressure of steam within the supply pipe 3 is atmospheric, the pressurestat remains in equilibrium. Likewise, assume that the return line 8 is open to atmosphere, as through the branch 75, and the valve 77 which is open, so that atmospheric pressure prevails within the radiators 4, 4. The traps 7, if they are not open, will quickly open and since there is no differential upon the orifices 6 flow will not occur. The radiators, the supply line and the return line are full of air at this time. Now assume that by hand the variable accumulator 70 is raised slightly, for example, by reference to the chart or scale 79, so that the level registers with the graduation 60 on the scale 79, it will be seen at once that the pressurestat will be unbalanced in a direction to force the diaphragm plate 35 upwardly and close the circuit for motor 12 which tends to open the valve 2.

Opening of the valve will proceed until a pressure is established in the supply line 3 which acting through the pipe 61 upon the surface of liquid in the fixed accumulator 57 will bring the pressurestat to balance and open the circuit of motor 12, the circuit of motor 11 remaining open. Thereupon a certain pressure difference between the supply main and the interior of the radiators is imposed upon the orifices 6 and a flow through such orifices occurs partially filling the radiators with steam. The percentage of filling of the radiators 4, 4 with steam then corresponds to the percentage of the total range of operations represented by the difference between graduations 60 and 70. In other words, if the difference between 60 and 70 represents 10% of the range, then 10% of the radiator will be filled. The condensate of the radiators then is returned through the return pipe 8 and is drained to atmosphere as through the branch 75. If the pressurestat 70 is now raised to a higher value, as, for example, to the graduation 50, a further increase in the pressure in the supply pipe 3 will be occasioned. Thus throughout the entire range of outside temperatures for which the system has been designed, the proper supply of steam to secure corresponding partial filling of the radiators 4, 4 may be secured by manually adjusting the height of the accumulator 70 to the corresponding scale graduation.

If instead of operating with the base line, that is the return pipe pressure, at atmospheric it is desired to operate at a sub-atmospheric pressure, then the atmospheric branch 75 may be closed off and the pump 10 employed to maintain a vacuum in the return line.

A suitable pressure controlled regulator such as 80, which may consist of a Bourdon tube 81 controlling the mercury of bulb switch 82 may govern the motor 9 to maintain a fixed, or substantially fixed, value of subatmospheric pressure in the return line 8. In that event the valve 72 is opened to admit the prevailing base pressure, that is the sub-atmospheric pressure prevailing in the return line, to the inside of the chamber 66 of the variable accumulator 70. Now assuming that the valve 2 is closed, the pump 10 will first evacuate the return line and the radiators and will reduce the pressure prevailing in the supply pipe 3 and its connected branches. The controller 80 when it has reduced the pressure to a fixed value for which the controller 80 is set, will stop the pump and hold the vacuum on the system. The pressure upon opposite sides of the pressurestat 30 is balanced at this time, assuming that the valve 2 is closed, and hence the controller 32 is opened, that is in neutral position, and the valve 2 will not be opened. However, if the variable accumulator 70 be now raised, for example, to the graduation 60, there will be a preponderance of pressure upon the top of the diaphragm 31 resulting in operation of the controller 32 to energize the motor 12 and to open the valve 2 until the pressures upon opposite sides of the diaphragm 31 are equalized, whereupon a corresponding steam pressure will exist in the supply pipe 3 above the base or reference pressure in the return line 8.

Thus by manual adjustment of the variable accumulator 70 to the various points throughout the range of operation the heat emission of the radiators may be controlled in accordance with the requirements determined by outside temperature.

Under this scheme of partial filling of the radiators which corresponds to the curve C—D of Figure 25 the heating fluid is metered out to the radiators and the rate of heat emission is not subject to variation inasmuch as the rate of flow to the radiator is controlled and no more heat can be emitted than the rate of flow of fluid will yield. For this mode of operation at either atmospheric return line pressure or sub-atmospheric return line pressure the traps 7 are not essential but may be employed to prevent the escape of steam in case the proportioning of the radiators to the steam flow is not strictly accurate. When the variable accumulator 70 has been raised to the zero mark on the scale 79 corresponding to maximum output of heat the radiators 4, 4 are to be completely filled without closing the steam traps.

The system thus far described may also be operated on a constant differential with variable steam pressures and temperatures according to the curves A—B on Figure 25 by maintaining a constant pressure difference between the supply and the return line as by means of the differential regulator 83 which is subjected to the two pressures, namely, the supply line pressure through the pipe 84 which communicates with the supply pipe 3, and the connection 85 which communicates with the return line pressure.

The pressure regulator 83 comprises two expansible elements of different effective diameters 86 and 87 which will balance and open the motor circuit only when a predetermined difference in pressure between the supply line and the return line is maintained. It is to be understood in practice that condensers with constant levels such as that shown at 57 may be interposed in the pipes 84 and 85 to prevent accumulation of condensate from varying the proper pressures acting upon the regulator 83. In such event the variable accumulator with its scale 79 should be raised an amount equal to the head represented by the difference between the curves A and B when the system is put into operation. That is to say, when the supply pressure is always to be maintained a predetermined amount above the return pressure the variable accumulator must be raised above the level of liquid in the fixed accumulator an amount equal to the pressure difference so that the pressurestat 30 will be maintained in balanced condition.

Under this mode of operation the radiators are always filled with steam and the traps 7 are closed or just sufficiently open to permit the condensate to escape. The traps 7 may here also be dispensed with because the return line pressure is controlled to be a suitable amount below the pressure imposed upon the orifices so that no more steam than enough to fill the radiator will be admitted.

I have above described how the system shown in Figure 1 may be regulated by hand according to the mode of operation represented by the constant differential and variable pressure of curves A and B or according to the variable differential and partial filling method of operation represented by the curves C and D.

Now I shall describe the automatic means for effecting the regulation of the system according to either mode of operation.

*Automatic thermostat control*

For automatic thermostatic control of the system I provide a bank 90 of thermostats. These thermostats are preferably mercury bulb switches actuated by bi-metallic elements, as will be more fully disclosed in connection with Figures 22 to 24, inclusive, but may consist of any suitable mechanism for closing one of a plurality of circuits at a time in accordance with the variations of outside temperature. The bank of thermostats 90, shown in Figure 1, comprises a series of ten running from 20° below zero F. to 70° above zero F. These thermostats are adapted to close their respective circuits when a temperature corresponding substantially to the particular setting of a particular thermostat is attained. That is to say, the thermostat Q is adapted to close its circuit when the outside temperature is substantially 70°. If the temperature is materially either above or below this point, the circuit through the thermostat Q is open. These thermostats are preferably exposed to the outside temperature as on the roof of the building or otherwise exposed to the controlling temperature or to a temperature which is always substantially proportional to the controlling temperature.

Each of the thermostats has its own circuit connected to a common return wire on the one side, as shown at 91, and an individual wire led through a cable 92 to the selector mechanism 93 which selector mechanism is adapted to register a contact member with the particular circuit which is energized leaving connected apparatus which is controlled jointly with the contact selector in a corresponding position.

The circuit is relatively simple, as may be seen from Figure 2. The common wire 91 leads to all of the thermostats and their branch wires 95 to 104, inclusive, are connected to contacts in the selector mechanism 93. The selector mechanism has a pair of movable brush members, shown in dotted lines on Figure 2 at 105 and 106. These brush members are adapted to make contact with certain bars 107 and 108 and the aligned contacts which they may overlap. The branch thermostat wires 95 to 104 are connected to contacts 95a to 103a in the right hand bank in line with the bar 108 and to the lower contact in the left hand bank which is in line with the bar 107. The contacts 96a to 103a are connected in multiple to the contacts 96b to 103b in the left hand bank of contacts. The two wipers 105 and 106 slide upon rods 109 and 110, respectively, and these rods in turn are connected through brushes 111 and 112 through separate branches containing controlling magnets 113 and 114 to a common wire 115 extending to the operating motor 116 to the source of current 117, which may be any source of commercial current such as a 110 volt A. C. or D. C. circuit.

The magnets 113 and 114 control the actuation of the two brush members 105 and 106 which are connected together to cause the same to move down or up, respectively. This will be more fully understood by reference to Figures 3 and 4. The selector mechanism including the contacts and movable brush members is shown more in detail in Figures 6 to 10, inclusive.

Referring now to the construction shown in Figures 3 to 5, I shall describe the operation of the cam selector mechanism which causes a motion of the brush members to seek a position corresponding to the last energization of a thermostat circuit. It is to be understood that the corresponding motion is taken from said mechanism and applied to the variable accumulator 70 so as to move it to different positions which will give the necessary heat emission from the radiators to correspond to that required to maintain the room at the predetermined temperature inside when a specific temperature as determined by the closing of a thermostat circuit prevails on the outside.

*Cam selector mechanism*

Referring more particularly to Figures 3 and 4, I provide a frame 120 upon which is mounted the driving motor 116 and the mechanism driven thereby. This base plate or frame 120 is preferably supported upon suitable supporting legs 121, as shown in Figure 1.

The shaft of the motor 116 is connected through a flexible coupling 122 to a propeller shaft 123 which carries at its end a conical friction pulley 124. This conical friction pulley is adapted to engage with one side or the other of the conical groove 125 in the wheel 126. When the conical pulley 124 engages with the lower side 127, as shown in Figure 4, the wheel 126 will be driven in one direction, and when the conical pulley 124 engages with the upper conical flange 128 the wheel is driven in the opposite direction. The propeller shaft 123 is supported adjacent the pulley 124 in a movable bearing 129 which comprises a stationary guide member 130 in which a sliding box 131 is guided and this sliding box 131 has a movable bearing 132 which permits of rocking of the shaft 123 sidewise without binding said bearing 132 upon the shaft 123. The shiftable box or slide 131 is connected at opposite sides through links such as 133 and 134 to bell crank levers 135 and 136, the longer arms of which are connected through tension springs 137 and 138 to the cores of solenoids 113 and 114. These solenoids have their windings connected in series with the winding of the motor 116. Hence, the energization of the circuit including either one of these solenoid windings also energizes the motor 116 so that, depending upon which solenoid is energized, the wheel 126 will be driven in one direction or the other. While I have shown the solenoids 113 and 114 in series with the motor, it is to be understood that they may be otherwise arranged so long as the control of the driving motor in a proper direction is exercised by the selector.

The wheel 126 is mounted on a shaft 139 supported in a suitable journal 140 and it carries, at its opposite end, the pinion 141, which pinion in turn meshes with a large gear wheel 142 bearing a pinion 143 which in turn meshes with the large gear wheel 144 mounted upon the shaft 145 of the winding drum 146, which winding drum is composed of two sections, namely, 147 of large diameter and 148 of small diameter, as illustrated in Figure 5.

The winding drum shaft which is driven by the large gear 144 has a pinion 150 adjustably mounted thereupon as by means of the clamping nut 150. The pinion 151 meshes with a large gear wheel 152 which has mounted thereupon or connected thereto the cam 153, the gear wheel 152 and cam 153 being adjustably mounted upon the spindle or shaft 154 as by means of the clamping nut 155. The reason for the adjustable clamping of the pinion 150 and gear wheel 152 is to permit of individual adjustment of the winding drum 146 and the cam 153. The shafts of the respective gears and pinions are supported on one side by a downwardly extending plate 156 connected to the top plate of the base 120, and on the other side these shafts are supported by a narrow plate 157 next to said side plate 156 as by means of suitable posts or pillars. The detailed construction of this mechanism may be widely varied, it being remembered that there is to be a winding drum and a cam jointly operated in one direction or the other by a suitably controlled motor mechanism.

The cam 153 cooperates with a follower or stem 160 which is connected to the brushes of the selector mechanism, as may be seen by reference to Figures 6 and 7. The stem 160 has a follower roller 161 which rides upon the edge of the cam.

As shown in Figures 3 and 6, the selector brush mechanism is at substantially the upper limit of its motion and the cam is substantially at the limit of its motion in one direction. The cam selector comprises a plate or mounting board of insulation 163 (see Figures 6 to 10, inclusive) and upon it are mounted the contacts and bars heretofore mentioned and the guide rods 109 and 110 with their respective brushes 111 and 112 which normally engage therewith but which are adapted to be separated from the guides when the brush member reaches the limit of its motion. The brush member, designated as a whole 165, comprises two separate sets of contact making apparatus which I have designated the brushes 105 and 106, but which in reality consist of a series of contact fingers to insure good contact with the bars and stationary contacts, respectively. The brush member 165 comprises a plate or frame 166 having lugs or brackets 167 and 168 at its ends, the lower lug or bracket 168 being connected to the rod 160 so that the two brush members 105 and 106 are moved in unison. Between the lugs or brackets 167 and 168 I mount sets of swinging fingers such as 169 comprising the brush 106 and the swinging fingers 170 comprising the brush member 105. These swinging fingers have hubs which are drilled and mounted either directly upon the rods 109 and 110, or they may be mounted upon separate sleeves supported by the lugs or brackets 167 and 168 and said sleeves then mounted upon the rods 109 and 110.

It will be seen that the separate swinging fingers can adjust themselves to any irregularities of the stationary contacts and to permit this to a maximum degree I provide individual springs 171 mounted in individual pockets 172 for each one of the brush members.

In order to provide a position limit for the motion of the selector brush 165 I provide inclined projections 174 and 175 upon the lugs or brackets 167 and 168, respectively, for lifting the brushes 111 or 112, respectively, upon motion of the brush member 165 to the limit of motion in either direction. The operation of the cam selector will readily be understood by reference to Figures 2 and 6 to 10. Assume that when the brushes 105 and 106 are in the position shown in Figure 2, namely at the top of the stroke corresponding to minimum heat emission from the radiators due to relatively high outside temperature. If now the outside temperature should drop to 60° so that the thermostat R is closed, the closing of the circuit of the thermostat R energizes wire 96, contact 96a and contact 96b, which in turn transmit current to the brush 111 and to the controlling solenoid 113 and motor 116. Thereupon the cone pulley 124 is pressed against the corresponding side of the wheel 126 to cause the cam to be rotated clockwise, as viewed in Figure 3, allowing the selector brush to drop. The selector brush upon leaving the contact 96b opens the circuit and stops further movement. The separation between contacts is minimum in order that there shall be a minimum of lost motion as between up and down.

It can be seen, therefore, that for each temperature range within which a thermostat closes the selector brush will assume a definite position whereupon the mechanism will be stopped. In other words, there is a definite position for the brush for a corresponding outside temperature range within which the individual thermostat is designed to close its circuit.

While I have shown the thermostat as closing for temperatures which are substantially 10° apart, it is to be understood that in practice the steps may be made much smaller, if desired.

The thermostats are so constructed that they will close the circuit within a small temperature range corresponding to substantially a given temperature and open the circuit for a temperature range on either side of the selected temperature.

*The thermostats*

Individual thermostats are of the construction shown in Figures 22 to 24 in the preferred form of the invention. A suitable channel bar 180 is provided for a mounting for the thermostats. The thermostats each comprise a bimetallic spiral element 181 the outer end of which is secured to the bottom of the channel bar 180 as by means of the bolt 182. The inner end of the spiral element 181 is clamped to a post 183 which is preferably square in cross-section. The clamping plate 184, which is held by means of the screws 185, to the post 183 clamps the inner end of the spiral element to the post.

The ends of the post 183 are fitted into sockets 186 formed in plates 187, these sockets preferably being formed by securing a washer 188 having a square hole therein to the plate 187. Suitable cradle members 190 and 191 are secured in contact with the plates 187 as by means of the screws 189 which extend through the cradle members and the plates 187 and into the posts 183. The cradle members are provided with pointers such as 192 cooperating with graduations on the plates 187 as indicated at 193 in Figure 22. The cradle members 190 and 191 are preferably formed of sheet metal and they support mercury glass bulb switch elements 194 and 195, these switch elements being so adjusted that at substantially a single critical position the circuits will be closed in series through both of them but upon tilting of the posts 183, that is rocking in either direction from the critical position, the circuit will be opened at one of the contacts or the other. Thus my system operates on normally open circuits, but it is apparent to those skilled in the art that the reverse operation might be true, namely, that the system might operate on normally closed circuits and that the opening of the circuit by thermostatic movements of the switch members to a predetermined position might control the movement. The two mercury bulbs 194 and 195 are connected in series and so adjusted that for substantially a given temperature value the circuit is closed through both of them simultaneously but upon change of temperature the post 183 will be rocked to open the circuit for either a higher or a lower temperature.

I do not intend to limit the system to the use of this specific form of thermostat, as any equivalent mechanism for selecting a particular circuit in response to the prevalence of a certain outside temperature or temperature range may be employed. For instance, in Figure 26 I have shown a thermostat with a single active element. In this case a bar 197 preferably of a material which has a minimum thermal coefficient of expansion supports a member such as the wire 199 in tension between the fixed abutment 200 on the member 197 and a swinging arm 201 pivoted at 202 on the frame member 197 and maintained in tension by the weight 203 acting upon the arm 204. A longer arm 205 giving greatly multiplied motion carries a brush member 206 cooperating with the contacts of a contact bank 207 containing contacts which are closely grouped and adapted to be selected by said brush 206 in accordance with the contraction and expansion of the wire or tape 199. In this manner a particular circuit is closed for substantially a particular outside temperature. The contact 206 may be caused to jump from one contact of the bank 207 to the next one by interposing ridges of insulation which cause the contact or brush to hop with a definite snap motion from one contact to the other.

Winding drum

The winding drum 146 has a suitable cable 209 connected thereto, this cable being extended over pulleys such as 210 and 211 and connected to the variable accumulator 70 as by means of a lug formed on top of the chamber 66.

Assume that the cable is connected to the larger portion 147 of the drum, that is the portion which is of the larger diameter, it will be seen that a greater range of motion will be caused than if the cable were wound solely upon the smaller diameter portion 148.

The relation of the cam 153 to the drum 146 is important as by this relation the various pressures of steam in the supply main 2 are controlled by the various steps of the thermostat bank 90. The steps of the thermostat bank 90 are shown as being of equal values, that is equal increment or decrement of, for example, 10°. Assume that the predetermined room temperature is 70°. It will be apparent, of course, that heat emission from the radiator is a function of temperature difference inside and outside, assuming always that the same amount of surface is active or that the character of medium upon each side of the radiator is the same.

Where the control orifices 6 govern the rate of heating fluid admission to the radiator for partial filling, it is to be remembered that the rate of flow through the orifice is within limits substantially in accordance with the well known formula of $V^2=2gh$, where V is velocity, $g$ is acceleration due to gravity and $h$ is the pressure difference or head. In order, therefore, to secure equal increments in flow it is necessary that the pressure difference be varied in accordance with the square root law. It will be apparent, therefore, that the cam 153 in such a system should be generated according to that law throughout so much of the range of the system as corresponds to operation according to partially filled radiators. If the system works throughout its range on the partial filling, then the cam as a whole is generated on increments of throw which are in accordance with the square roots of increments of revolution.

The cam is a real controlling element since it operates the brush member 165 to bring the same to the selected position as determined by the energized thermostat circuit, and it may, therefore, be considered that the increments of throw are uniform and that the increments of rotation are variable. This gives variable increments of lift or drop of the variable pressure accumulator 70.

In Figure 13 I have indicated a spiral or snail shell cam in which the square root law is embodied particularly between the points 25 and 70. Between the successive positions marked according to temperature readings the outward throw is the same but the angular motion is different in accordance with the curve A—E—C' of Figure 25. While the cam shown in Figure 13 embodies two revolutions it is obvious that any number of revolutions desired may be employed, the cam follower being changed in proportion and the winding drum being also suitably proportioned.

The cam shown in Figure 13 is generated to control in accordance with the scheme of partial filling as illustrated by curves C—D on Figure 25, but obviously the cam may be generated to provide the respective pressures indicated on the curve A. That is to say, by using a differential controlling regulator the curve B is maintained always at a predetermined value below the curve A; the said points on curve A may be maintained by variations of positions of the variable accumulator 70 and this in turn is controlled by the cam. It will thus be seen that my system is capable of automatically controlling the emissions of heat from the radiators in accordance with outside requirements through the working range of the system and according to either system of steam supply, that is either constant differential and variable temperature and pressure or at variable supply pressure constant return pressure and partial filling of the radiators.

Now I shall describe in connection with Figure 27 the preferred embodiment of the invention which is based on the regulation of heat emission from the system partially by variable filling of the radiators for lower heat requirements and partially by complete filling of the radiators with variable pressure steam for the higher heat requirements. In other words for milder outside temperature the variable differentiates between supply and return as represented by the part of the curve C—D to the right of the point E—F are employed and for colder temperatures constant differential as shown by the part of the curves A—B lying at the left of point E—F are employed.

My system is capable of operation on a continuous curve of supply pressure and a continuous curve of return line pressure since I provide means for varying separately the supply line pressure and the return line pressure according to any laws that I may wish to embody in the apparatus.

Dual system

By reference to Figure 25 it may be seen that the increments of pressure from 25° to 70° are very small whereas the increments of pressure from 25° to zero are very large. If the cam and drum be related for the small steps of pressure, the small part of the winding drum should be employed and where the larger steps of pressure are to be employed the larger part of the drum 146 could advantageously be employed. Now in the dual system of my invention where the heat emission is controlled in part of the range by variable volume and in the remainder of the range by variable temperature the cable 209 is preferably passed from one part of the drum to the other where the period or point of transition occurs.

It will be understood also that where this period of transition or change from the one theory to the other occurs that the return line pressure should be differently controlled. This may readily be done by switching the constant pressure regulator 80 into control of the motor 9 for the vacuum pump 10 for the range to the right of points E—F on the curve of Figure 25 and switching in the constant differential regulator 83 for that part of the range lying to the left of points E—F in Figure 25. This may be done by a simple selector switch 88 controlled by the cam selector in passing the points E—F as by a simple, commutator switch or the like as shown in Fig. 1.

I may, however, as shown in Figure 27, employ a special control member in the form of a separate variable pressure accumulator 220 which is like the pressure accumulator 70 that controls the steam pressure. It cooperates with a fixed pressure accumulator 221 and a pressurestat 222 to control the vacuum maintained in the return line 8. The large diameter portion of the drum 146 has an additional cable 223 extending over pulleys 224 and 225 and connected to the variable accumulator 220. The winding cable 223 plays only over the larger diameter part of the drum 146 whereas the cable 209 which operates the variable accumulator 70 plays partly on the larger diameter part 147 and partly on the smaller diameter part 148, the point of transition being the point E on the curve shown in Figure 25. If desired, the cable 223 may be merely branched from the cable 209 and it then goes slack when the head 226 rests upon the base 228.

Thus so long as the cable 209 is playing on the larger diameter portion of the drum 146 the two accumulator heads 66 and 226 will rise and fall together. It is to be observed that for the maximum heat requirement position which is shown in Figure 27 the heads 66 and 226 are at the upper end of their travel. The head 66 is maintained a predetermined distance above the head 226. This head represents the constant differential throughout the constant differential range of operation.

A stand 227 having a pocket 228 for receiving and supporting the head 226 in a fixed position is provided for stopping the motion of said head 226 for thereafter maintaining the pressure in the return line constant, as shown by line D' to the right of the point F in Figure 25. When the head 226 rests in the socket 228 the head 66 of the variable accumulator 70 is still free to move. Such arrival of the head 226 upon its rest 228 corresponds with the arrival of the head 66 in a position corresponding to the point E and corresponds also to the change of the cable 209 from the large diameter portion to the small diameter portion. Thereafter for rotation of the drum 146 in lowering the head 66 smaller increments of motion corresponding to the smaller increments of pressure occur due to the changed relation of the diameter of the drum to the rotations of the cam 153. When the cable 209 is running on the small diameter portion 148 a predetermined angular motion of the shaft of the drum results in proportionally less motion of the head 66.

The pressurestat 30 may be of the construction shown in Figure 1 and likewise the construction of the pressurestat 222 may be as shown at 30 in Figure 1, the pressurestat 30 controlling the switch for the motors 11 and 12 to open and close the control valve 2 and the pressurestat 222 controlling a switch 229 which governs the motor 230 of the vacuum pump 10. The operation of the thermostats and the selector switch 93 is as described in Figure 1 and it is coordinated through the cam 153 with the winding drum 146, as previously described. Instead of employing a single motor and a clutch for determining the direction of rotation of the drum and cam, I have shown two motors connected to the same worm shaft 233, these two motors 231 and 232 being included in different branches and governed by the brushes 105 and 106 cooperating with the stationary bars and contacts to cause the appropriate motor to drive the drum and the cam until the cam shifts the brushes 105 and 106 to the proper position as determined by the thermostats in the bank 90.

The reason for the two diameter drums will more readily apparent from a consideration of the diagram shown in Figure 28, which shows the character of the curve obtainable by the system shown in Figure 27. Instead of a smooth curve A—B the step curve a—b is obtained. Likewise, instead of the smooth curve C' the step curve c' is obtained, the uniform return line pressure curve d' being the same since that remains constant and is not stepped.

Now by laying Figure 28 alongside of Figure 27, part 2, and considering the figures of absolute pressure applied to the ordinates at the left of Figure 28 and also at the left of Figure 27, the mode of operation of the device will be readily apparent.

Operation of the dual system

Assume that the parts are in the position shown in Figure 27 which corresponds to the upper left hand part of the curve of Figure 28. The level in the chamber 66 stands above the level in the chamber 57 by a predetermined amount, and it may be assumed that atmospheric pressure prevails over both the level in 66 and in 57. The level in the chamber 226 stands even with the level of liquid in the chamber 221 and atmospheric pressure prevails over both of these levels. The selector 93 has its brush member 165 moved to the bottom of its stroke corresponding to maximum steam demand upon the system. Assuming that the valve 2 is closed and that atmospheric pressure prevails in the system the difference in head between the level in 66 and in 57 unbalances the pressurestat 30 with the result that the circuit controlling switch 32 is actuated to energize motor 12 to open the control valve 2 for admitting steam to the supply main 3.

In setting the system into operation the pump 10 is preferably operated to fill the radiators 4 with steam as rapidly as possible and to assist in doing this the air is pumped out by operation of the pump 10. As soon as steam hits the thermostatic traps 7, they close, and the radiators then remain filled with steam.

The restrictions or orifices 6 at this time do not control partial filling of the radiators but assist in distributing the steam to the various radiators of the system to insure substantially prompt filling of all of them. When the pressure in the main 3 reaches a value which, being added to the head of the fixed accumulator 57, balances the diaphragm in the pressurestat 30 the switch 32 is opened and the valve 2 remains in predetermined position, said valve 2 operating as a flow restriction between the pipe 1 and the distributing system 3.

Since the return line system is at substantially atmospheric pressure at this stage, the switch 229 remains open. It is to be understood that the preliminary pumping of air out of the radiators and return line system is employed only for the purpose of filling the radiators and not for changing the pressure in the return line.

Assume that outside temperature rises to 10° closing the circuits of the thermostat W. Thereupon contact 103a is energized and through the brush member 106 motor 231 is energized to operate the drum and the cam.

The rotation of the cam in a counter clockwise direction as viewed in Figure 27, part 1, raises the brush member 106 off of the contact 103a opening the circuit and stopping the further rotation of the parts. Such rotation of the cam is accompanied by rotation of the drum member 146 which lowers both heads 66 and 226 by the first step shown in Figure 28. This immediately unbalances both pressurestats 222 and 30 and results in a shifting of the position of the valve 2 and results in the maintaining of a different return pressure, that is, a higher vacuum or lower absolute pressure corresponding to the stepped curve in Figure 28.

Successive approaches towards the minimum heat requirements will bring the head 226 to the support 228 and thereafter the relation between the static head of said variable accumulator 220 and the fixed accumulator 221 will remain constant maintaining a constant vacuum in the return line 8.

At the point where the head 226 rests in the seat 228 the head 66 is still the predetermined distance above the head 226 and at this point the cable 209 passes from the larger diameter portion of the drum to the smaller diameter portion and succeeding steps of the cam mechanism correspond to the small steps shown on the curve of Figure 28 to the right of the points E and F. When the position of the valve 2 has reached the requirement indicated by the point E, there is just sufficient steam delivered to the radiators to keep them filled.

On the next step of closing of the valve 2 the valve will be closed to a degree which will not quite fill the radiators 4, 4 because of the restricting effects of the orifices 6, 6 in relation to the pressure difference which exists upon opposite sides of the same. In other words the differential across the orifice is not great enough to supply sufficient flow of steam to maintain the radiator full. For successive downward steps of the head 66 smaller steam supply pressures will be maintained in the main 3 and, consequently, smaller percentages of the radiators 4 will be filled through the orifices 6. Air and non-condensible gases accumulate and occupy the space not filled by steam. The steam traps 7, since they are no longer impinged by steam, open as soon as fractional filling of the radiator begins and maintain a predetermined pressure, namely, the return line pressure, within the radiators 4, 4 the part of the radiator which is not filled with steam being filled with air at the pressure prevailing in the return line 8.

It will be understood that as the pressure upon the steam in the supply main 3 is reduced it tends to expand in volume and to lower in temperature. A pound of steam will occupy a much larger space at the lower range of pressures called for by Figure 28 than it will at the higher ranges of the pressure. The result is the orifices 6, 6 become effective for volume control when they are not above a certain critical region of pressure which is approximately that of the point E. The control of steam delivered to the radiators by means of the orifices may be retained throughout the entire range, as described in connection with the system of Figure 1, by suitable control of the pressure difference across the orifices.

While I have shown in Figure 27 the thermostats as separated by temperature differences of 10°, it is to be understood that in the preferred practice of the invention thermostats of sufficient number to operate on 5° intervals are preferred. This calls for an increased number of contacts in the selector 93 but such may be readily provided.

By reference to the table of Figure 30, the ratio of increments or decrements of pressure to increments or decrements of outside temperature in 5° steps may be appreciated. The larger diameter drum is employed for the steps lying above 25° and the smaller diameter drum is employed below. It will be seen that this makes possible a fairly uniformly increasing scroll cam and in fact a cam like that shown in Figure 13 may be employed in conjunction with a two diameter drum that gives a curve shown in Figure 28.

While the apparatus is shown diagrammatically in Figure 27, it is believed that by reference to the prior detailed description of parts, the operation and structure will be readily understood. In reference to the two diameter cam, an idler such as 232 shown in Figure 5A may be employed adjacent the periphery of the larger diameter portion 147 so that change from the one part to the other is accomplished without sidewise motion of the cable 209. Such idler 232 is a refinement which may be omitted.

In Figures 17 to 21 I have shown a form of variable accumulator which may be employed for either the accumulator 70 or the accumulator 220, or both. In this case a framework having a horizontal member 233 and a vertical member 234 supports the pulley, such as 235, over which the cable 236 is trained. The accumulator head 237 provides a chamber which is maintained in vertical position by a weight 238 attached to the bottom thereof, this chamber being shown in section in Figure 19. An overflow pipe 239 controls the level of liquid in said chamber 237. The chamber 237 has a pair of hollow bosses 240 and 241 through which connections are made to tubular links such as 242. These links 242 have elbow connections 243 with the hollow bosses 240 and 241 to provide a rotary connection between said tubular arms and the inside of the chamber 237. Such rotary joints are formed by a conical plug member 244 formed on the elbow 243 and a corresponding conical seat 245 formed in the end of the boss 240. The plug 244 is held in proper relation to its seat as by means of a flanged fitting 246 threaded on the end of the boss 240 and engaging a flange on the plug member 244. The fitting 246 is preferably locked in place as by a lock nut 247. Joints of a similar character may be provided between the tubular links 242 and the adjacent links 248, and in turn between the links 248 and the lower links 249 and also between the links 249 and the stationary connection 250 shown in Figure 20.

The stationary connection 250 provides outlets 251 and 252, one of which is connected to the level controlling pipe 239 in the chamber 237 and leads to valve 72, as shown in Figure 1, or to the corresponding overflow connection, whereas the other connects to the pressurestat in connection with which it is employed.

The links 242 and 248 are connected by a chain or cable 253 which limits the angular separation of these two members. As shown in the diagram of Figure 18, the collapsible tubular linkage permits the head or chamber member 237 to be raised and lowered in a regular and orderly fashion without interference. The end of the link 249 which is hinged to the link 248 is adapted to rest upon a stop 254 on the vertical frame member 234 and, obviously, a stop may be provided for supporting the joined ends of the links 242 and 248 when they are in their lowered positions. The employment of this form of variable accumulator is optional. It is to be observed that the vertical movement of the accumulator should be equal to the variations in head of a column of water corresponding to the variation in pressure in the steam supply pipe. Obviously, instead of water some other liquid may be employed with a corresponding variation in the height of the column.

I do not intend to be limited to the use of a variable hydraulic element for controlling the pressurestat as, obviously, the diaphragm which is subjected on one side to the supply pressure or the return line pressure, as the case may be, may be variably loaded as by means of a spring, or it may be variably loaded as by means of a series of weights. An example of the latter is shown in Figure 29, where a flexible element 256 is connected to the cable, such as 209, and this flexible element 256 is formed of a chain consisting of a series of links. The corrugated diaphragm member 31 has a plate 35 to which an arm 257 is connected pivotally, this arm at the left being pivoted at 258 to a link 259, and at the right being connected to the arm of a bell crank lever 260 to which the bulb 261 of a mercury switch 262 is connected. The switch 262 is preferably mounted upon a suitable bracket or pedestal 263 on the base member 53. The lower margin of the diaphragm member 31 is clamped to the base member 53, which base member defines a chamber below the diaphragm, said chamber being in communication with the pipe 56 which leads, for example, to the fixed accumulator such as 57. This fixed accumulator may be placed at any desired level which corresponds to the requirements of the system. For example in Figure 27 the accumulator is placed at such a level above the pressurestat that the entire range between 16 pounds absolute and 4 pounds absolute may readily be secured upon the pressurestat.

The diaphragm plate 35 (Figure 29) has a cup or receptacle 264 connected thereto for receiving the chain 256 which chain is raised or lowered for variably loading the diaphragm 31. The chain may consist of uniform weight of links or it may have variable weight of links, depending upon the work which it is to perform.

It will be appreciated from the foregoing description and disclosure that the system of my invention offers certain practical advantages in fine gradations of heat emission with minimum sized radiators, and with all the advantages of variable volume in one part of the range and variable temperature in another part of the range.

While I have shown a system of separate thermostats or a system of thermostatic control which depends upon division of the temperature range into certain steps or increments, it is to be understood that the advantages of my system so far as its mode of control of the supply and return pressures through the cam and variable relation between the cam and drum may be obtained regardless of the particular system for stopping the cam at predetermined positions. That is to say, I may by a system of thermostatic control cause the starting and stopping of the drum as variations of a continuous smooth curve instead of a stepped curve, or I may make the steps very much smaller, if so desired, all within the range of the invention. I consider, however, that the arrangement of separate thermostats and of a thermostatic control having separate and definite temperature responses is highly advantageous and is an important aspect of the invention here claimed.

The setting of the thermostats may be according to non-uniform steps so as to assist in the equalization of the travel of the cam member 153.

It is also to be understood that a non-uniform drum for either the larger diameter portion or the smaller diameter portion might be employed and a straight spiral cam 153 be utilized. It is, however, simpler to have the drums of uniform diameter, that is either large or small, and to have the variable embodied in the cam.

In the form of the invention herein illustrated the ratio of diameter of the two parts of the drum 146 is approximately 11 units for the diameter of the portion 147, namely, the portion of larger diameter, and 1 unit for the diameter of the small diameter portion 148. This, of course, may be varied without departing from the invention. It would be varied by shifting of the point E in Figures 25 and 28. It is to be noted that uniform throw of the cam and variable winding of the drum is the equivalent of variable throw of the cam and uniform winding of the drum. All that is required is that there is the controlled variable relation between uniform steps in the thermostatic response and the variable steps in pressure control. In the lower ranges of heat delivery, it may be advisable to have a variable throw of the cam and yet not have the drum uniform in diameter.

By reference to Figure 28, and also as shown in Figure 25, the horizontal curve D', which represents substantially constant pressure in the return main and, hence, in the radiator until it is filled, need not be strictly horizontal.

It might be inclined downwardly to the right, as viewed in Figures 25 and 28, if desired. The practical consideration is, of course, the ability of the vacuum pump to handle the vacuum, and within the capacity of the vacuum pump the line D' may be dropped downward in steps corresponding to the line C'. This might readily be done by providing the drum 146 with a smaller diameter portion at the remote end, as shown in Figure 27, part 1, so that the cable 223 would play out at a rate less than the cable 209 plays out when it comes upon the reduced portion 148 of the drum 146. In other words, the accumulator head 226, instead of coming to an absolute stop on the stand 227, might begin to drop at a less rate as it approached the desired minimum pressure in the return main and radiator. This can be readily controlled by the design of the part of the drum upon which the cable 223 plays. While the increments of temperature response of the cam's throw for rectilinear motion of the selector brush are substantially uniform, the increments of angular motion of the winding drum may be anything which is predetermined and desired in order to secure the various pressures in the supply and return mains throughout the ranges.

While I have shown, in the lower part of the heating range, that the return pressure or suction is kept substantially constant and the supply pressure is varied, it is to be understood that the relation throughout this part of the range, or throughout the entire range, might be varied, namely, that the steam pressure might be kept constant and the return pressure varied.

For example, if steam were supplied at atmospheric pressure, it can be seen that increases in heat delivery might be secured readily by increases in suction in the return line. This could readily be done by suitable control of the pressurestat heads 66 and 226. Any combination of such relation is possible within my invention, since the two pressures are separately controlled and one is not necessarily a consequence of the other.

The cam selector may have an indicator thereon for indicating the temperature position to which it has last moved and, hence, it would indicate the outside temperature.

Suitable scales may be attached to any of the parts for indicating their position and from which deductions as to other variables may be made, or in which they may be graduated. The pressurestats are the means for comparing the pressure of the variable pressure accumulators or their equivalents with the fluid pressure in the supply or return mains, and the switch and valve, or the switch and pump, are the means for making such pressures equal or of a predetermined ratio. The selector brush 165 is a movable member which is moved to predetermined positions in response to outside temperature and the winding drum with its cable is a transmission member which is connected to the selector brush or movable selector member through the cam 153, which is a variable ratio transmission or connection between these two parts.

The valve 2 is, in reality, a pressure reducing valve and it is preferably so constructed that for uniform increments of motion along its axis the plug 17 causes uniform increments of opening area. The motors 11 and 12 might vary the loading of a diaphragm type of pressure reducing valve instead of merely controlling the position of the valve member 17.

The variable pressure accumulators need not be placed above the pressurestat, they might move below the level of the pressurestat for higher vacuum in the steam main, but it is preferable to have them so disposed that there is no tendency for them to lose their contents, hence, preferably, they are always maintained in a position where they may be readily filled by the introduction of liquid at the connections 65—65 shown in Figure 27.

Referring to the diagrams of Figures 25 and 28, it is to be observed that during the variable volume filling of the radiators, the steam temperature is constant, since the pressure in the radiators is always that of the return main. Throughout variable filling of the radiators, the steam trap is open to the extent of permitting the outflow of water of condensation and air and the maintenance in the radiator of the pressure of the return line. As soon as the steam trap closes, due to filling of the radiator, the pressure in the radiator immediately tends to rise due to the pressure of the supply main as shown to the left of the line E—F in Figures 25 and 28.

Hence, there is a region in which the orifice begins to lose its effect and in which the steam trap begins to grow effective, which provides a more or less gradual transition from one condition to the other.

I do not intend to be limited to the details shown and described except as they are recited in the appended claims.

I claim:—

1. In combination a steam supply main, a valve governing the pressure of steam in the main, radiators having connections to the main and a return main for said radiators, flow control orifices in the connections between said radiators and the supply main, a variable fluid pressure accumulator having a movable element by motion of which fluid pressures are established in said accumulator, a pressurestat subject to the variable pressure of steam in the supply main and to the variable pressure of the accumulator, and means governed by said pressurestat for adjusting said valve to regulate the steam pressure in the main, a series of thermostatic elements individually responsive to substantially equal steps of temperature change, and a cam member controlled by said thermostatic elements for controlling the movement of said movable element of the accumulator in nonuniform steps, said valve responding to admit more steam to the radiators when the heat demand increases.

2. In a heating system, a steam supply main, a valve controlling the pressure of steam in said main, radiators, connections comprising orifices between the steam main and the radiators, a return main, a pressure responsive element, a fixed pressure accumulator for holding a fixed head of liquid with the pressure of the supply main thereupon, said accumulator communicating with one side of the element, a variable pressure accumulator for providing a variable head of liquid communicating with the other side of said element, movable control means for adjusting the height of liquid head in said accumulator, and means governed by the difference of pressure upon the two sides of said element for governing the operation of said valve for varying the pressure of steam in said main.

3. In a heating system, a steam supply main, a valve controlling the pressure of steam in said main, radiators, connections comprising orifices between the steam main and the radiators, a return main, a pressure responsive element, a fixed pressure accumulator for holding a fixed head of liquid with the pressure of the supply main thereupon, said accumulator communicating with one side of the element, a variable pressure accumulator for providing a variable head of liquid communicating with the other side of said element, means governed by difference of pressure upon the two sides of said element for varying the pressure of steam in said main, a series of thermostatically controlled contacts, and means controlled by operation of said contacts to vary the head of said accumulator upon said element to control the steam pressure in the main as a function of temperature.

4. In combination a steam supply main, radiators connected thereto, a return main for the radiators, a valve for controlling the pressure in the supply main, a pump for controlling the pressure in the return main, means responsive to outside temperature for controlling the valve to increase the steam pressure with increase in heat demand, and means also responsive to outside temperature for controlling the pump to increase the vacuum with decrease in heat demand.

5. In combination a steam supply main, radiators connected thereto, a return main for the radiators, a valve for controlling the pressure in the supply main, a pump for controlling the pressure in the return main, temperature responsive means subject to outside temperature, a mechanism controlled by the temperature responsive means, means movable by said mechanism for governing the position of the valve to control steam pressure in the main to increase the steam pressure with increase in heat demand, and means movable by said mechanism for governing the action of said pump to control return main pressure to increase the vacuum with decrease in heat demand.

6. In combination a steam supply main, radiators connected thereto, a return main for the radiators, a valve for controlling the pressure in the supply main, a pump for controlling the pressure in the return main, temperature responsive means subject to outside temperature, a mechanism controlled by the temperature responsive means, a first means movable by said mechanism for governing the position of the valve to control pressure in the steam supply main to increase the steam pressure with increase in heat demand, said first means comprising a variable pressure accumulator having a member movable for establishing different fluid pressures in accordance with different positions of the movable member, and a second means movable by said mechanism, for governing the action of said pump to control return main pressure to increase the vacuum with decrease in heat demand, said second means comprising a variable pressure accumulator having a member movable to various positions for establishing various fluid pressures.

7. In a steam heating system a steam supply main, radiators connected to the main, a return main for the radiators, a valve controlling the pressure of steam in the steam main, a pump for controlling the pressure in the return main, a first variable pressure accumulator having a member movable to various positions to provide various corresponding fluid pressures, a second variable pressure accumulator having a member movable to various positions to provide corresponding fluid pressures, an automatic temperature controlled mechanism for moving said members to positions corresponding to prevailing outside temperatures, a first pressure responsive element subject to the difference in pressure between the first variable pressure accumulator and the supply main for controlling the operation of the valve to increase the steam pressure with increase in heat demand, a second pressure responsive element subject to the difference in pressure between the second variable pressure accumulator and the return main for controlling the operation of the pump to increase the vacuum with decrease in heat demand.

8. In combination a steam heating system comprising a steam supply main, radiators connected to the main, a return main for the radiators, a valve controlling the pressure of steam in the steam main, a pump for controlling the pressure in the return main, a first variable pressure accumulator having a member movable to various positions to provide various corresponding fluid pressures, a second variable pressure accumulator having a member movable to various positions to provide corresponding fluid pressures, a temperature responsive mechanism having a member movable to predetermined positions corresponding to predetermined temperatures, and connections between said last named movable member and the movable members of said variable pressure accumulators, respectively, a first pressure responsive element subject to the difference in pressure between the first variable pressure accumulator and the supply main for controlling the operation of the valve to increase the steam pressure with increase in heat demand, a second pressure responsive element subject to the difference in pressure between the second variable pressure accumulator and the return main for controlling the operation of the pump to increase the vacuum with decrease in heat demand.

9. In combination a plurality of thermostatically controlled contacts, a circuit controlled by said contacts in accordance with temperature changes, a member controlled by said circuit, said member being movable to predetermined positions in response to operation of said contacts, and a member having angular motion, said latter member being connected to said first member through a connection providing a variable ratio between the motions of said members, an adjustable steam supply valve, means under the control of said second named member for changing the adjustment of said steam supply valve, a plurality of radiators, and a source of steam supply connected to said radiators through said supply valve, said variable ratio connection being arranged to increase the relative movements of the second mentioned member with respect to the first mentioned member as the heat demand increases, and said valve being actuated so as to supply more steam with increases of heat demand.

10. In a steam heating system, a steam supply main, radiators connected to the supply main, a return main for the radiators, a first pressure control device controlling the pressure of steam in the steam main, a second pressure control device for controlling the pressure in the return main, a first variable pressure accumulator having a member movable to various positions to provide various corresponding fluid pressures in said accumulator, a second variable pressure accumulator having a member movable to various positions to provide corresponding fluid pressures in said second accumulator, a first pressure responsive element subject to the difference between the pressure in the first variable pressure accumulator and the pressure in the supply main for controlling the operation of the first pressure control device, a second pressure responsive element subject to the difference between the pressure in the second variable pressure accumulator and the pressure in the return main for controlling the operation of the second pressure control device, a thermostatically controlled member movable through a predetermined range of movement corresponding to a predetermined temperature range, said last named member being movable to predetermined positions corresponding to predetermined temperatures within said temperature range, the movable members of said variable pressure accumulators being connected to said latter member, said accumulators maintaining a substantially constant difference of pressure between them for certain predetermined positions of the latter member and means for causing said accumulators to maintain varying differences of pressure between them throughout another part of the range of movement of said latter member, the differences in the pressures of said accumulators being less throughout the lower heat demands and greater throughout the higher heat demands.

11. In a steam heating system, a steam supply main, radiators connected to the supply main, a return main for the radiators, a first pressure control device controlling the pressure of steam in the steam main, a second pressure control device for controlling the pressure in the return main, a first variable pressure accumulator having a member movable to various positions to provide various corresponding fluid pressures in said accumulator, a second variable pressure accumulator having a member movable to various positions to provide corresponding fluid pressures in said second accumulator, a first pressure responsive element subject to the difference between the pressure in the first variable pressure accumulator and the pressure in the supply main for controlling the operation of the first pressure control device, a second pressure responsive element subject to the difference between the pressure in the second variable pressure accumulator and the pressure in the return main for controlling the operation of the second pressure control device, the pressures in said variable pressure accumulators being initially adjusted to maintain a predetermined difference between the pressure in said supply main and the pressure in said return main throughout a part of the range of control exercised by said accumulators, automatic means for jointly varying the positions of said accumulators, and means for holding the movable member of one of said accumulators stationary to maintain the pressure in the corresponding main constant while the movable member of the other accumulator is movable to vary the pressure in its corresponding main, the differences in the pressures of said accumulators being less throughout the lower heat demands and greater throughout the higher heat demands.

12. In a steam heating system, a steam supply main, radiators, a return main for the radiators, a pressure control device controlling the pressure of steam in the steam main, a variable pressure accumulator having a member movable to various positions to provide various corresponding fluid pressures in said accumulator, a pressure responsive element subject to the difference between the pressure in the variable pressure accumulator and the pressure in the supply main for controlling the operation of the pressure control device, a plurality of thermostatically controlled contacts, a circuit controlled by said contacts in accordance with temperature change, a selector member controlled by the circuit, said member being movable to predetermined positions in response to operation of said contacts, a transmission member connected to said selector member through a connection providing a variable ratio between the motions of said members, and means connecting said transmission member to the movable member of said variable pressure accumulator, the steam pressure controlling device being actuated to supply greater steam pressures during the higher heat demands and lower steam pressures during lower heat demands.

13. In a steam heating system, a steam supply main, radiators, a return main for the radiators, a pressure control device controlling the fluid pressure in one of said mains, a variable pressure accumulator having a member movable to various positions to provide various corresponding fluid pressures in said accumulator, a fluid pressure responsive element subject to the difference between the pressure in the variable pressure accumulator and the pressure in one of said mains for controlling the operation of said pressure control device, a plurality of thermostatically controlled contacts, a circuit controlled by said contacts in accordance with temperature change, a selector member controlled by the circuit, said member being movable to predetermined positions in response to operation of said contacts, a transmission member connected to said selector member through a connection providing a variable ratio between the motions of said members, and means connecting said transmission member to the movable member of said variable pressure accumulator, the steam pressure controlling device being actuated to supply greater steam pressures during the higher heat demands and lower steam pressures during lower heat demands.

14. In a steam heating system, a steam supply main, radiators connected thereto, a return main for the radiators, a pressure control device for controlling the fluid pressure in one of said mains, a variable pressure accumulator having a member movable to variable positions to provide various corresponding fluid pressures in said accumulator, a pressure responsive element subject to the difference between the pressure in said variable pressure accumulator and the pressure in one of said mains for controlling the operation of said pressure control device, a plurality of thermostatically controlled contacts, a circuit controlled by said contacts in accordance with temperature change, a selector member controlled by the circuit, said member being movable to predetermined positions in response to operation of said contacts, a transmission member connected to said selector member through a connection providing a variable ratio between the motions of said members, and a connection between said transmission member and the movable member of said variable pressure accumulator, said last named connection causing the variable pressure accumulator to move through steps of variable size for equal steps of motion of the transmission member, said fluid pressure control device increasing the pressure within the corresponding main to a greater degree for higher heat demand than for lower heat demand.

15. In combination in a steam heating system a steam supply main, radiators connected to said main, a return main connected to the radiators, a plurality of thermostatically controlled contacts, a circuit for said contacts, means for switching said contacts relative to said circuit in accordance with temperature change, a selector member controlled by the circuit, said member being movable to predetermined positions in response to switching of said contacts, a transmission member connected to said selector member through a connection providing a variable ratio of motion between said members, whereby one of said motions is substantially equal to the square of the other motion and means actuated by said transmission member for controlling the fluid pressure in one of said mains to cause greater steam delivery to the radiators for temperature changes requiring greater heat delivery.

16. In a steam heating system, a steam supply main, radiators connected thereto, a return main for the radiators, a plurality of thermostatically controlled contacts, a circuit controlled by said contacts in accordance with temperature change, a selector member controlled by the circuit, said member being movable to predetermined positions in response to operation of said contacts, a transmission member connected to said selector member through a connection providing a variable ratio of motion between said members, whereby one of said motions is substantially equal to the square of the other motion and means actuated by said transmission member for controlling the fluid pressure in both of said mains, said fluid pressures being controlled to cause greater rate of steam supply to the radiators for responses of the thermostatically controlled contacts indicating greater heat demand.

17. In a steam heating system, a steam supply main, radiators connected thereto, a return main for the radiators, a plurality of thermostatically controlled contacts, a circuit controlled by said contacts in accordance with temperature change, a selector member controlled by the circuit, said member being movable to predetermined positions in response to operation of said contacts, a transmission member connected to said selector member through a connection providing variable ratio between the motions of said members, movable control means for controlling the pressure in said supply main, movable control means for controlling the pressure in said return main, and separate connections from said transmission member to each of said control means, said connections transmitting the same motion to both of the members throughout a part of the range of motion of said transmission member and transmitting a reduced motion to one of the members throughout another part of the range of motion of the transmission member to supply greater rates of steam flow upon higher heat demands than upon lower heat demands.

18. In a steam heating system, a steam supply main, radiators connected thereto, a return main for the radiators, a plurality of thermostatically controlled contacts, a circuit for said contacts means for switching said contacts relative to said circuit in accordance with temperature change, a selector member controlled by the circuit, said member being movable to predetermined positions in response to operation of said contacts, a winding drum, a connection between said winding drum and the selector member comprising a cam, movable control means for controlling the pressure in said supply main, movable control means for controlling the pressure in said return main, and cables connected to the drum for operating said movable control means, said selector member and said winding drum having different rates of motion, one of said motions being in accordance with the throw of the cam and the other of said motions being in accordance with the traverse of the cam to provide greater rates of steam supply for higher heat demands and less rates of steam supply for less rates of heat demand.

19. In a steam heating system, a steam supply main, radiators connected thereto, a return main for the radiators, a plurality of thermostatically controlled contacts, a circuit controlled by said contacts in accordance with temperature change, a selector member controlled by the circuit, said member being movable to predetermined positions in response to operation of said contacts, a winding drum, a connection between said winding drum and the selector member comprising a cam, movable control means for controlling the pressure in said supply main, movable control means for controlling the pressure in said return main, cables connected to the drum for operating each of said movable control means, said drum having portions of different diameter and one of said cables cooperating with both of said portions of different diameter, said selector member and said winding drum having different rates of motion, one of said motions being in accordance with the throw of the cam and the other of said motions being in accordance with the traverse of the cam to provide greater rates of steam supply for higher heat demands and less rates of steam supply for less rates of heat demand.

20. In a steam heating system a steam supply main, radiators connected thereto, a return main for the radiators, an automatic temperature controlled mechanism having a member movable to predetermined positions in response to definite values of temperature, said mechanism including a winding drum having portions of different diameter, adjustable control means for governing the pressure in one of said mains, and a cable wound upon both portions of said drum and connected to said control means for securing greater rates of steam delivery when the temperature control means indicates greater heat demand and lower rates of steam delivery for lower rates of heat demand.

21. In a steam heating system, a steam supply main, a plurality of radiators connected thereto, a return main for the radiators, a movable temperature controlled device, a first pressure control device controlling the fluid pressure in the supply main, a second pressure control device controlling the fluid pressure in the return main, said second pressure control device maintaining the pressure in the return main constant until such a demand is reached that the radiators are full of steam, and means actuated by said temperature control device for governing the action of both of said pressure control devices to maintain a substantially constant difference of pressure between said mains after the radiators are full of steam.

22. In a steam heating system, a steam supply main, a plurality of radiators connected to said main, a return main for the radiators, a winding drum consisting of two parts of different diameter, a cable adapted to be wound upon both parts of said drum, a variable pressure accumulator connected to the drum by said cable, a pressurestat connected to the variable pressure accumulator and to the steam supply main, a pressure control device for controlling the steam pressure in said supply main, said pressure control device being governed by said pressurestat, and a pressure control device for maintaining a constant pressure in the return main while the cable is cooperating with the small diameter part of the drum.

23. In a steam heating system, a steam supply main, a plurality of radiators connected to said main, a return main for the radiators, a winding drum consisting of two parts of different diameter, a cable adapted to be wound upon both parts of said drum, a variable pressure accumulator connected to the drum by said cable, a pressurestat connected to the variable pressure accumulator and to the steam supply main, a pressure control device for controlling the steam pressure in said supply main, said pressure control device being governed by said pressurestat, a pressure control device for maintaining a constant pressure in the return main while the cable is cooperating with the small diameter part of the drum, and means for controlling the movement of said winding drum in steps of non-uniform angular motion.

24. In a steam heating system a radiator for giving off heat throughout a range of heat demand, a steam supply main for said radiator, a flow controlling restriction between said main and the radiator, a return main for the radiator, means for varying the pressure of steam in the supply main, means for varying the pressure in the return main, and a common control member for each of said means, both said means acting conjointly to cause sufficient steam to flow into the radiator to maintain the same full of steam for large heat demand and acting conjointly to limit the flow of steam into the radiator to secure fractional filling only of the radiator for small heat demand.

25. In combination, a steam supply main, a first regulator controlling the pressure in said main, a plurality of radiators connected to said supply main, a return main for the radiators, a second regulator for controlling the pressure in the return main, a thermostat, movable means under the control of said thermostat assuming different positions according to the temperature to which the thermostat is subjected, a first setting means for adjusting the setting of the first regulator, said first setting means being controlled by the positioning of said movable means to control the first regulator to decrease the pressure in the supply main as the heat demand indicated by said thermostat is decreased and a second setting means for adjusting the setting of the second regulator, said second setting means being also controlled by the positioning of said movable means, to control the second regulator to reduce the pressure in the second main as the heat demand indicated by the thermostat is reduced.

26. In a steam heating system, a supply main, a radiator connected to the supply main, a pressure regulator for the supply main, said regulator having a member subject to the pressure of the main upon one side, adjustable fluid pressure applying means to apply an adjustable fluid pressure upon the other side of said member, a thermostat, a circuit selectively controlled by the thermostat, a selector switch for the circuit, a motor member under the control of said circuit for shifting said selector switch to a predetermined position in response to the action of the thermostat, and means movable by the motor in shifting the selector switch for adjusting said adjustable fluid pressure applying means to apply a loading to the said member which varies in a non-linear relation to the variations of the temperature to which the thermostat is subjected, said relation causing the pressure regulator to supply pressures at increasing rates for increases in heat demand and at decreasing rates for decreases in heat demand.

27. In a steam heating system, a steam supply main, radiators connected to the supply main, a return main for the radiators, a vacuum pump for the return main, temperature responsive means, a first fluid pressure responsive means responsive to absolute pressure in the return main for controlling the operation of said vacuum pump to maintain a predetermined absolute pressure in the return main, a second fluid pressure responsive means responsive to the difference in pressure between the supply and the return main for controlling the operation of said pump to maintain a predetermined difference in pressure between supply and return mains, and selector means actuated by said temperature responsive means for selectively placing one of said pressure responsive means in control of said vacuum pump, said first pressure responsive means being employed throughout the lower range of heat demands and the second pressure responsive means being employed throughout the upper range of heat demands.

28. In a steam heating system, a steam supply main, radiators connected to the supply main, a return main for the radiators, a vacuum pump for the return main, temperature responsive means, a first pressure responsive means responsive to absolute pressure in the return main for controlling the operation of said vacuum pump to maintain a predetermined absolute pressure in the return main, a second pressure responsive means responsive to the difference in pressure between supply and return mains for controlling the operation of said vacuum pump to maintain a predetermined difference in pressure between supply and return mains, pressure control means under the control of said temperature responsive means for varying the steam pressure in said supply main, and selector means actuated by said temperature responsive means for selectively placing one of said pressure responsive means in control of said vacuum pump, said first pressure responsive means being employed throughout the lower range of heat demands and the second pressure responsive means being employed throughout the upper range of heat demands.

29. In combination, a supply main, a return main, radiators having inlets providing communication with the supply line and outlets communicating with the return main, thermostatic means subject to outside temperature, regulating means controlled by said thermostatic means for varying the steam pressure in the supply line as an inverse function of the outside temperature to which the thermostatic means is subjected, and means directly under the control of said thermostatic means for varying the absolute pressure in the return line as an inverse function of the outside temperature to which the thermostatic means is subjected to supply greater steam flow upon greater heat demand and less steam flow for less heat demand.

30. In combination, a supply main, a return main, radiators connected between said mains, there being metering inlet orifices between the supply main and the radiators, a first control means for varying the absolute pressure of steam in the supply main inversely in relation to the outside temperature variations, a second control means independent of the pressures controlled by said first control means for controlling the absolute pressures in the return line inversely in relation to the outside temperature variations, and thermostatic means subject to outside temperature for governing both said control means to supply greater steam flow upon greater heat demand and less steam flow on less heat demand.

31. In combination, a supply main, a return main, radiators connected between said mains, a first control means for varying the absolute pressure of steam in the supply main inversely in relation to the outside temperature variations, a second control means for varying the absolute pressure in the return main inversely in relation to the outside temperature variations, and thermostatic means responsive in definite steps to variations of outside temperature for governing both of said control means to cause them to hold predetermined definite values of absolute pressure in the supply main and in the return main for definite steps of temperature response of said thermostatic means, said values of pressure being varied to supply greater steam flow upon greater heat demand and less steam flow on less heat demand.

32. In combination, a supply main, a return main, radiators connected between said mains, a first controller governing absolute pressure in the supply main, a second controller governing absolute pressure in the return main, and thermostatic means governing both of said controllers in common throughout a part of the temperature range to which the thermostatic means is responsive to decrease the pressure in both of said mains according to a predetermined rate of decrease as the heat demand indicated by the thermostat decreases, and governing one of said controllers individually throughout another part of said range to decrease the pressure in one of said mains according to a different predetermined rate of decrease.

33. In combination, a supply main, a return main, radiators connected between said mains, a first controller governing the absolute pressure of steam in the supply main, a second controller governing the absolute pressure in the return main, said second controller maintaining a predetermined difference in pressure between supply and return mains, thermostatic means governing the setting of said first controller, and a switch, for cutting out said second controller upon a predetermined response of said thermostatic means.

34. In combination, a supply main, a return main, radiators connected between said mains, a first controller governing absolute pressure in the supply main, a second controller governing absolute pressure in the return main, thermostatic means governing the setting of said first controller, a third controller for maintaining a predetermined difference in pressure between supply and return mains, and a switch controlled by said thermostatic means selectively governing the operation of either the second controller or the third controller.

35. In combination in a heating system comprising a supply line, a return line, and radiators connected therebetween, of a vacuum producing means, a governor therefor, a thermostatic device responsive to temperature to which the system is subjected having means for controlling the governor to create higher vacuum with lower heat demand, means cooperating with said controlling means below a predetermined heat demand for controlling the governor to prevent increase of the vacuum in said return line and automatic means for regulating the steam supply in the supply line in accordance with heat demand as indicated by the thermostatic device.

36. In combination in a steam heating system comprising a supply line, a return line, radiators connected between the said lines, a thermostat subject to outside temperatures, a pressure regulator under the control of said thermostat for controlling the pressure of steam in the supply line to furnish more steam when the heat demand is greater and less when the heat demand is less, vacuum producing means for evacuating the return line, a differential pressure regulator subject to the pressure in the supply line and in the return line, said differential pressure regulator controlling the vacuum producing means, and means governed by said thermostat for cutting out the control of said vacuum producing means by said differential pressure regulator when the heat demand has dropped below a predetermined value.

37. In a system of the class described, a steam radiator, a steam supply pipe for the radiator, means for controlling the admission of steam into the supply pipe, a return line for the radiator, means for controlling the absolute pressure in the return line, said radiator having means to prevent the passage of steam therethrough, and means responsive to outside temperatures automatically controlling both the aforesaid means independently, said admission controlling means being governed by said temperature responsive means to admit more steam for colder outside temperatures and less steam for moderate outside temperatures, said return line pressure controlling means being governed by said temperature responsive means to secure a higher absolute pressure in the return main for colder outside temperatures and lower absolute pressures in the return main for moderate outside temperatures.

38. In combination, a steam main, radiators connected thereto, a return main connected to said radiators, a pump for withdrawing fluids from said return main, a temperature responsive device, a variable pressure accumulator comprising movable means under the control of said device for establishing fluid pressures in said accumulator in accordance with temperature variations, said pressure in said accumulator being increased for the higher heat demands, means controlled by said temperature responsive device for admitting more steam to the steam main for higher heat demands and less steam for lower heat demands, and means controlled by the difference between pressure in the return main and pressure in said accumulator for controlling said pump to secure higher return pressures with increases of heat demand during the upper range of heat demands and to hold said return pressures substantially constant during the lower range of heat demands to which the temperature responsive device is subject for decreasing the steam flow during lessened steam demand.

JOHN A. SERRELL.